US012802323B2

(12) United States Patent
Wu et al.

(10) Patent No.: US 12,802,323 B2
(45) Date of Patent: Nov. 17, 2026

(54) METHOD AND APPARATUS FOR TRAINING VIDEO GENERATION MODEL, STORAGE MEDIUM, AND COMPUTER DEVICE

(71) Applicant: Tencent Technology (Shenzhen) Company Limited, Shenzhen (CN)

(72) Inventors: Yang Wu, Shenzhen (CN); Pengfei Hu, Shenzhen (CN); Xiaojuan Qi, Shenzhen (CN); Xiuzhe Wu, Shenzhen (CN); Ying Shan, Shenzhen (CN); Jing Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 49 days.

(21) Appl. No.: 18/597,750

(22) Filed: Mar. 6, 2024

(65) Prior Publication Data

US 2024/0212252 A1 Jun. 27, 2024

Related U.S. Application Data

(63) Continuation of application No. PCT/CN2023/118459, filed on Sep. 13, 2023.

(30) Foreign Application Priority Data

Oct. 13, 2022 (CN) ........................ 202211255944.4

(51) Int. Cl.

*G06T 13/40* (2011.01)
*G06T 7/70* (2017.01)

(Continued)

(52) U.S. Cl.

CPC ................ *G06T 13/40* (2013.01); *G06T 7/70* (2017.01); *G06T 7/90* (2017.01); *G06T 13/205* (2013.01);

(Continued)

(58) Field of Classification Search

None

See application file for complete search history.

(56) References Cited

U.S. PATENT DOCUMENTS 11,017,560 B1 * 5/2021 Gafni .................... G06N 20/20
11,295,501 B1 4/2022 Biswas et al.

(Continued)

FOREIGN PATENT DOCUMENTS

CN 113192162 A 7/2021
CN 113269872 A 8/2021

(Continued)

OTHER PUBLICATIONS

Yi et al., "Predicting Personalized Head Movement from Short Video and Speech Signals", (Year: 2022).*

(Continued)

*Primary Examiner* — Hilina K Demeter

(74) *Attorney, Agent, or Firm* — Morgan, Lewis & Bockius LLP

(57) ABSTRACT

This application discloses a method for training a video generation model performed by a computer device. A phonetic feature, an expression parameter, and a head parameter are extracted from a training video of a target user. Network training is performed on a neural radiance field based on the condition input, three-dimensional coordinates, and a viewing direction to obtain a video generation model. The video generation model is obtained through training based on an image reconstruction loss. By introducing the head pose information and the head position information in the training process, a consideration of a shoulder motion status can be introduced into the video generation model so that a motion between the head and the shoulder is more coordinated and stable.

20 Claims, 9 Drawing Sheets

(51) Int. Cl.

| | |
|---|---|
| ***G06T 7/90*** | (2017.01) |
| ***G06T 13/20*** | (2011.01) |
| ***G06V 10/774*** | (2022.01) |
| ***G06V 10/776*** | (2022.01) |
| ***G06V 10/82*** | (2022.01) |
| ***G06V 20/40*** | (2022.01) |
| *G06V 40/16* | (2022.01) |
| *G10L 25/69* | (2013.01) |

(52) U.S. Cl.

CPC .......... *G06V 10/774* (2022.01); *G06V 10/776* (2022.01); *G06V 10/82* (2022.01); *G06V 20/46* (2022.01); *G06T 2207/10024* (2013.01); *G06T 2207/30201* (2013.01); *G06V 40/174* (2022.01); *G10L 25/69* (2013.01)

(56) References Cited

U.S. PATENT DOCUMENTS

| | | | | |
|---|---|---|---|---|
| 11,429,817 | B2 * | 8/2022 | Luo | G06N 3/0464 |
| 11,429,835 | B1 * | 8/2022 | Valentin | G06T 17/00 |
| 2019/0124400 | A1 * | 4/2019 | Wang | H04N 21/2187 |
| 2021/0027512 | A1 * | 1/2021 | Park | G06N 3/045 |
| 2021/0074046 | A1 * | 3/2021 | Gong | G06T 11/60 |
| 2022/0044463 | A1 | 2/2022 | Kang et al. | |
| 2024/0062495 | A1 * | 2/2024 | Shu | G06T 19/20 |

FOREIGN PATENT DOCUMENTS

| | | | |
|---|---|---|---|
| CN | 113822969 | A | 12/2021 |
| CN | 114202604 | A | 3/2022 |
| CN | 114782596 | A | 7/2022 |

OTHER PUBLICATIONS

Mildenhall et al., “NeRF: Representing Scenes as Neural Radiance Fields for View Synthesis”, (Year: 2022).*

Gafni et al., “Dynamic Neural Radiance Fields for Monocular 4D Facial Avatar Reconstruction”, (Year: 2021).*

Yi et al., “Predicting Personalized Head Movement from Short Video and Speech Signal”, (Year: 2022).*

Sunderhauf et al., “Density-aware NeRF Ensembles: Quantifying Predictive Uncertainty in Neural Radiance Fields”, (Year: 2022).*

Tencent Technology, ISR, PCT/CN2023/118459, Nov. 24, 2023, 3 pgs.

* cited by examiner

METHOD AND APPARATUS FOR TRAINING VIDEO GENERATION MODEL, STORAGE MEDIUM, AND COMPUTER DEVICE

CROSS-REFERENCE TO RELATED APPLICATIONS

This application is a continuation application of PCT Patent Application No. PCT/CN2023/118459, entitled "METHOD AND APPARATUS FOR TRAINING VIDEO GENERATION MODEL, STORAGE MEDIUM, AND COMPUTER DEVICE" filed on Sep. 13, 2023, which claims priority to Chinese Patent Application No. 202211255944.4, entitled "METHOD AND APPARATUS FOR TRAINING VIDEO GENERATION MODEL, STORAGE MEDIUM, AND COMPUTER DEVICE", and filed with the China National Intellectual Property Administration on Oct. 13, 2022, all of which is incorporated herein by reference in its entirety.

FIELD OF THE TECHNOLOGY

This application relates to the field of computer vision technologies, and in particular, to a method and an apparatus for training a video generation model, a storage medium, and a computer device.

BACKGROUND OF THE DISCLOSURE

In recent years, the face reenactment (Face Reenactment) technologies have attracted much attention due to its application prospects in media, entertainment, virtual reality and other aspects. The generation of talking portrait videos, as an important task for face reenactment, is widely used in video conference, video chat and virtual human scenarios. For example, a user may use a reconstructed portrait of themselves with good appearance to participate in a video conference on their behalf.

A main principle for the generation of the talking portrait videos is to use a reconstructed avatar of the user with better appearance to reenact the user's actual portrait motions. However, a talking portrait video generated by the related art is prone to uncoordinated movements of the user's human body tissues in the reconstructed video. This greatly reduces realism of a video generation result presented to the user.

SUMMARY

An embodiment of this application provides a method and an apparatus for training a video generation model, a storage medium, and a computer device. The purpose is to improve movement coordination of a talking portrait video during generation.

In one aspect, an embodiment of this application provides a method for training a video generation model. The method is performed by a computer device, and the method includes: obtaining a training video of a target user; extracting a phonetic feature of the target user, an expression parameter of the target user from the training video, and a head parameter of the target user; synthesizing the phonetic feature of the target user, the expression parameter of the target user, and the head parameter of the target user to obtain a condition input of the training video; and performing network training on a neural radiance field based on the condition input, three-dimensional coordinates, and a viewing direction to obtain a video generation model, and the video generation model being configured to perform object reconstruction on a target video of the target user to obtain a corresponding reconstructed video of the target user.

In another aspect, an embodiment of this application provides a non-transitory computer-readable storage medium, the computer-readable storage medium storing a computer program, and the computer program, when executed by a processor of a computer device, causing the computer device to perform the foregoing method for training a video generation model.

In another aspect, an embodiment of this application provides a computer device, the computer device including a processor and a memory, the memory storing a computer program, and the computer program, when invoked by the processor, performing the foregoing method for training a video generation model.

According to the method for training a video generation model provided in this application, the phonetic feature, the expression parameter, and the head parameter are extracted from the training video of the target user. The head parameter is used for representing the head pose information and the head position information of the target user. The phonetic feature, the expression parameter, and the head parameter are synthesized to obtain the condition input of the training video. Further, the network training is performed on the preset single neural radiance field based on the condition input, the three-dimensional coordinates, and the viewing direction to obtain the video generation model, the video generation model being obtained through training based on the overall loss, the overall loss including the image reconstruction loss, the image reconstruction loss being determined based on the color value of the predicted object and the color value of the real object, and the color value of the predicted object being generated by the single neural radiance field based on the condition input, the three-dimensional coordinates, and the viewing direction. By introducing the head parameter into the condition input, the video generation model obtained through the network training can estimate, based on the head pose information and the head position information, a shoulder part and a motion status thereof. In this way, when the video generation model is used to perform object reconstruction on a target video of the target user to obtain a corresponding reconstructed video of the target user, a complete and realistic head part and shoulder part appear in the predicted video frame, and motion statuses of the head and the shoulder are kept coordinated. This greatly improves display realism of the reconstructed video.

BRIEF DESCRIPTION OF THE DRAWINGS

To illustrate the technical solutions in the embodiments of this application more clearly, drawings to be used in description of the embodiments are briefly introduced below. It is obviously that the drawings in the following description are only some embodiments of this application. For those skilled in the art, other drawings may be obtained based on these drawings without creative efforts.

DESCRIPTION OF EMBODIMENTS

Figure 1:
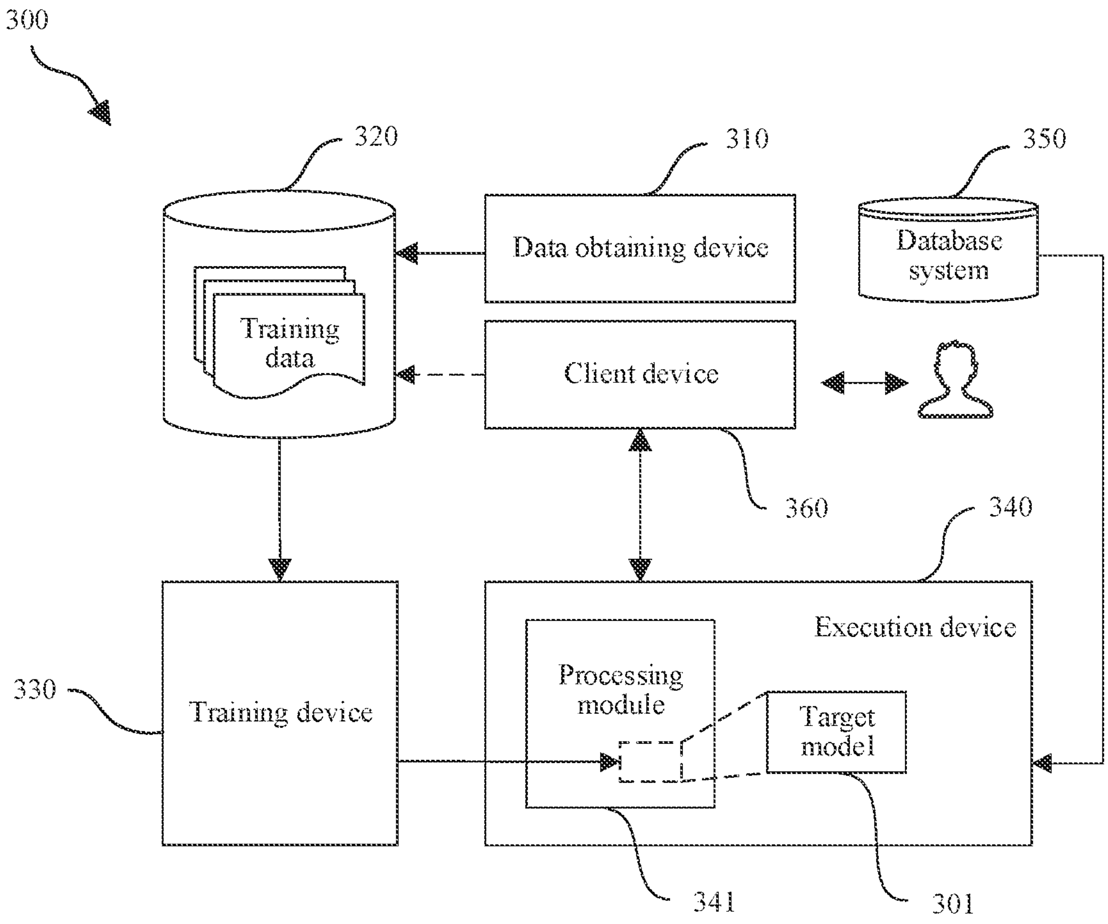
FIG. 1 is a schematic diagram of a system architecture according to an embodiment of this application.

Embodiments of this application are described in detail below, and examples of the embodiments are shown in accompanying drawings. The same or similar elements or the elements having the same or similar functions are denoted by the same or similar reference numerals throughout the description. The implementations described below with reference to the accompanying drawings are an example and used only for explaining this application, and are not to be construed as a limitation on this application.

To make a person in the art understand the solutions in this application better, the following clearly and completely describes the technical solutions in embodiments of this application with reference to the accompanying drawings in embodiments of this application. Apparently, the described embodiments are only some but not all embodiments of this application. All other embodiments obtained by a person of ordinary skill in the art based on embodiments of this application without creative efforts fall within the protection scope of this application.

In embodiments of this application, when relevant data such as a video involved is applied to specific products or technologies of the embodiments of this application, permission or consent of a user is required, and the collection, use and processing of the relevant data need to comply with the relevant laws, regulations and standards of relevant countries and regions. For ease of understanding, the following provides descriptions of relevant terms and notions involved in this application.

A method for training a video generation model in this application relates to artificial intelligence (Artificial Intelligence, AI) technologies, using the artificial intelligence technologies to automate training of the video generation model and automate subsequent video generation.

In a video conference, due to some personal concerns or preferences, it is not always convenient for users to show all participants their current real appearance and surroundings. In this case, a potential solution is to simulate an actual portrait motion of a user based on a good-looking reconstructed avatar to generate a high-fidelity talking portrait video (Talking Portrait Video). The reconstructed avatar in the talking portrait video matches the user's voice audio and real head motions, facial expressions, eye blinks and other motions. The foregoing solutions also benefit many other applications, such as digital human, film production, and multi-player online games.

Currently, modeling schemes for talking portrait video generation can be broadly divided into three categories: a model-based scheme, a generative adversarial network (Generative Adversarial Network, GAN)-based scheme, and a neural radiance field (Neural Radiance Field, NeRF)-based scheme. In the model-based scheme, generally, a three-dimensional (Three-Dimensional, 3D) model of a specific person is created based on red-green-blue (Red-Green-Blue, RGB) or red-green-blue-depth map (Red-Green-Blue-Depth map, RGBD) data, and a facial expression is put on this 3D model without considering a head motion, but a resolution of a generated result is limited. In the generative adversarial network-based scheme, generally, an adversarial learning mode is used to directly generate character appearance, but the learning process cannot learn a 3D geometry of a scene, and an additional reference image is needed to provide identity information.

The neural radiance field-based scheme mainly includes two methods using audio or motion as a driving source (Driving Source). The audio-driven method, for example, an audio driven neural radiance field (Audio Driven Neural Radiance Field, AD-NeRF), focuses on establishing a relationship between speech audio and visual appearance motion. The motion-driven method, for example, learning a mapping function, migrates a source motion or expression to a target face. However, the AD-NeRF relies on two separate neural radiance fields to simulate a head and a torso respectively, leading to a problem of network structure separation. NerFACE (an NeRF-based face modeling algorithm) is unable to generate a stable and natural torso sequence, resulting in uncoordinated motions between the head and shoulder of the reconstructed avatar in the reconstructed talking portrait video, and a lip shape of the reconstructed portrait generated by using the foregoing method is not synchronized with the user's lip shape.

To resolve the foregoing problems, an embodiment of this application provides a method for training a video generation model. The following introduces a system architecture of the method for training a video generation model involved in this application.

As shown in FIG. 1, the method for training a video generation model according to this embodiment of this application can be applied to a system 300. A data obtaining device 310 is configured to obtain training data. For the method for training a video generation model in this embodiment of this application, the training data may include a training video used for training. The data obtaining device 310 obtains training data, and stores the training data into a database 320. A training device 330 performs training based on the training data maintained in the database 320 to obtain a target model 301.

The training device 330 performs training on a preset neural network based on the training video until the preset neural network meets a preset condition to obtain the target model 301. The preset neural network is a single neural radiance field. The preset condition may be: An overall loss value of an overall loss function is less than a preset value, an overall loss value of an overall loss function no longer changes, or the number of training times reaches a preset number. The target model 301 can be used to implement generation of a reconstructed video in this embodiment of this application.

In an actual application scenario, the training data maintained in the database 320 is not necessarily from the data obtaining device 310, but may be received from other devices. For example, a client device 360 may alternatively be a data obtaining end, which stores the obtained data into the database 320 as new training data. In addition, the training device 330 does not necessarily perform training on a preset neural network based on the training data maintained by the database 320, but may perform training on the preset neural network based on training data obtained from cloud or other devices. The foregoing description is not to be construed as a limitation on this embodiment of this application.

The foregoing target model 301 obtained through training by the training device 330 can be used in different systems and devices, for example, can be used in an execution device 340 in FIG. 1. The execution device 340 may be a terminal, for example, a mobile terminal, a tablet computer, a notebook computer, augmented reality (Augmented Reality, AR)/virtual reality (Virtual Reality, VR), and so on, or may be a server or cloud. This is not limited herein.

In FIG. 1, the execution device 340 may be configured to perform data exchange with an external device. For example, a user may use a client device 360 to send input data to the execution device 340 over the network. The input data in this embodiment of this application may include: a training video or a target video sent by the client device 360. When the execution device 340 performs preprocessing on the input data, or when an execution module 341 of the execution device 340 performs calculation and other relevant processing, the execution device 340 may invoke data, a program, and the like from a data storage system 350 for corresponding calculation processing, and store data such as a processing result of the calculation processing and instructions into the data storage system 350. At last, the execution device 340 may return the processing result, namely, the reconstructed video generated by the target model 301, to the client device 360, so that the user may query the processing result on the client device 360. The training device 330 may generate a corresponding target model 301 based on different training data for different targets or different tasks. The corresponding target model 301 may be configured to implement the foregoing targets or fulfill the foregoing tasks, and provide a result required by the user.

For example, the system 300 in FIG. 1 may be of a client-server (Client-Server, C/S) system architecture. The execution device 340 may be a cloud server disposed by a service provider, and the client device 360 may be a notebook computer used by the user. For example, the user can use video generation software installed in the notebook computer to upload a target video to a cloud server over the network. When receiving the target video, the cloud server uses the target model 301 to perform portrait reconstruction, generate a corresponding reconstructed video, and return the reconstructed video to the notebook computer, so that the user can obtain the reconstructed video through the video generation software.

FIG. 1 is merely a schematic diagram of a system architecture according to this embodiment of this application. The system architecture and application scenarios described in this embodiment of this application is to illustrate the technical solutions of this embodiment of this application more clearly, and do not constitute a limitation on the technical solutions provided in an embodiment of this application. For example, the data storage system 350 in FIG. 1 is an external storage device relative to the execution device 340. In other cases, the data storage system 350 may be disposed inside the execution device 340. The execution device 340 may directly be a client device. A person of ordinary skill in the art may know that as the system architecture evolves and a new application scenario emerges, the technical solutions provided in embodiments of this application are also applicable to a similar technical problem.

Figure 2:
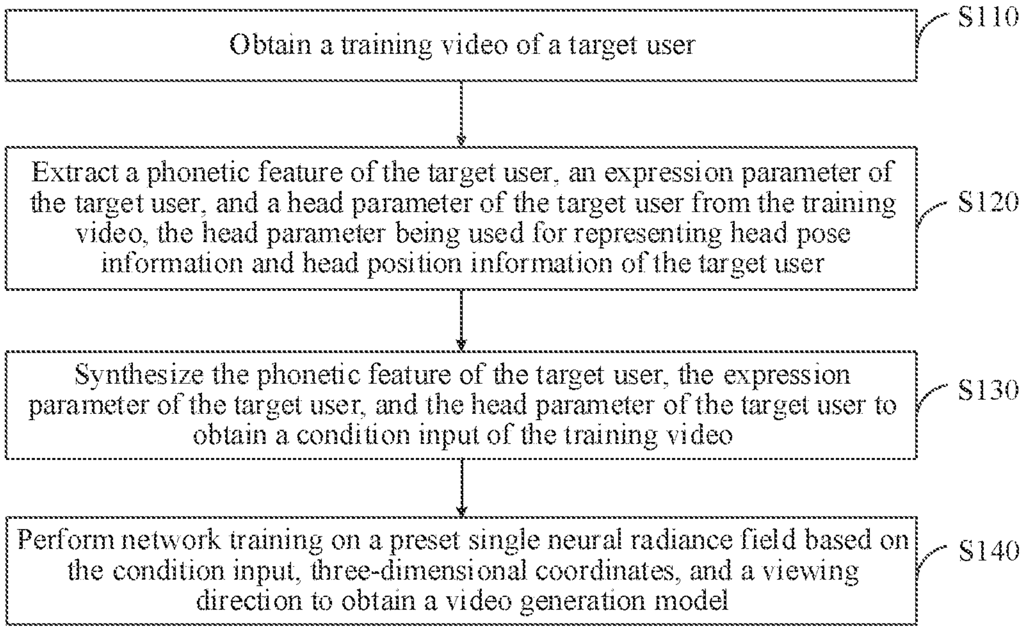
FIG. 2 is a schematic flowchart of a method for training a video generation model according to an embodiment of this application.

FIG. 2 is a schematic flowchart of a method for training a video generation model according to an embodiment of this application. In a specific embodiment, the method for training a video generation model is applied to an apparatus 500 for training a video generation model in FIG. 9 and a computer device 600 configured with the apparatus 500 for training a video generation model (FIG. 10).

The following uses a computer device as an example to illustrate a specific procedure of this embodiment. The computer device applied in this embodiment may be a server, a terminal, or the like. The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middle-ware service, a domain name service, a security service, a content delivery network (Content Delivery Network, CDN), a block chain, big data, and an AI platform. The terminal may be a tablet computer, a notebook computer, a desktop computer, a smart speaker, a smart watch, or the like, but is not limited thereto. The method for training a video generation model may specifically include the following steps:

S110: Obtain a training video of a target user.

S120: Extract a phonetic feature of the target user, an expression parameter of the target user, and a head parameter of the target user from the training video of the target user, the head parameter being used for representing head pose information and head position information of the target user.

S130: Synthesize the phonetic feature of the target user, the expression parameter of the target user, and the head parameter of the target user to obtain a condition input of the training video.

The methods using merely voice or expression as a driving source to generate a talking portrait video provided in the related art produces a non-negligible visual problem, that is, uncoordinated head-torso motions. A reason for this problem is that a neural radiance field tend to model a complete portrait as a rigid entity without distinguishing between a head motion and a torso motion. As a result, when an observation direction and a position of a camera changes, the entire portrait changes the direction in a rigid way, with shoulder motions shaking, leading to uncoordinated head motions and shoulder motions.

Therefore, this embodiment of this application creatively introduces the head pose information and the head position information of the user into the condition input, so that the neural radiance field can implicitly estimate a shoulder motion status based on the head pose information and the head position information, and the head motions and the shoulder motions are kept coordinated in a subsequent generated reconstructed portrait.

Based on this, the condition input includes at least the phonetic feature, the expression parameter, and the head parameter of the target user. The head parameter can be used for representing the head pose information and the head position information. The phonetic feature can be used for representing audio information when a user talks. The expression parameter can be used for representing facial expression information when a user talks, such as eye and mouth motions. The head pose information can be used for representing a head orientation of a user, and the head position can be used for reversely representing a shooting position of a camera.

In some embodiments, the step of extracting a phonetic feature of the target user, an expression parameter of the target user, and a head parameter of the target user from the training video includes the following steps:

(1) Perform phonetic feature extraction on the training video of the target user to obtain the phonetic feature.

In an embodiment, when obtaining a training video of a target user, a voice recognition model can be used to perform phonetic feature extraction on the training video. For example, when the training video is not associated with independent audio data, the audio data of the target user can be extracted based on the training video. When the training video is associated with independent audio data, the audio data of the target user can be obtained directly from a data package of the training video. Further, the audio data can be input into a DeepSpeech (DeepSPeech) model to output the phonetic feature.

In a possible implementation, the DeepSpeech model is formed in a structure of a plurality of RNN layers and CTC Loss, and is configured to learn speech-to-text mapping. In an embodiment of this application, the DeepSpeech model is configured to extract phonetic features from talking voice content of the target user. The obtained audio data is sampled to obtain a sample array. The data format of the audio data may be MP3 (MPEG-1 Audio Layer 3), WAV (WaveForm), or the like. Further, Fast Fourier Transform (Fast Fourier Transform, FFT) is performed on the sample array, and two layers of convolution (Relu function is used as an activation function) computation are performed on this basis to obtain convolved data.

A Shape operation is performed on the convolved data, and slice channel (Slice Channel) is performed on the operated data to obtain a preset number of data slices. Each data slice is input into each RNN layer separately, and output data is correspondingly obtained from each RNN layer. Concat (Concat) is performed on the output data to obtain latent code (Latent Code) corresponding to the audio data (Audio Data), that is, the phonetic feature a.

(2) Perform three-dimensional face reconstruction on the training video of the target user to obtain a face shape representation of a three-dimensional face shape of the target user, and determine the expression parameter of the target user based on the face shape representation.

The three-dimensional face reconstruction may refer to reconstructing a three-dimensional model of a face from one or more two-dimensional images. In an embodiment of this application, the two-dimensional image is a video frame of the training video. Therefore, the three-dimensional face reconstruction in this embodiment of this application refers to reconstructing the target user in the training video to obtain a three-dimensional face. The face shape representation includes a face shape and expression changes learned by the model from the three-dimensional face, and the expression parameter is determined based on the expression changes in the face shape representation.

In an embodiment, a corresponding expression parameter may be obtained from each video frame of the training video. In some embodiments, a 3D Morphable Model (3D Morphable Model, 3DMM) can be used to obtain the expression parameter from each video frame. The 3D morphable model can perform three-dimensional reconstruction on a two-dimensional face in a single video frame to obtain a corresponding three-dimensional face, that is, a three-dimensional face shape, and the face shape representation v of the three-dimensional face shape is:

$$v = \bar{v} + E^s s + E^e e,\ v \in \mathbb{R}^{3N}$$

$\bar{v} \in \mathbb{R}^{3N}$, $\bar{v}$ represents an average value calculated over a selected face dataset. $E^s$ and $E^e$ respectively represent a matrix of orthogonal basis vectors of shape space and expression space. s and e respectively represent a shape coefficient and an expression coefficient. N represents the number of vertices in a three-dimensional face mesh (3D Face Mesh). Further, the expression coefficient e may be used as the expression parameter of a reconstructed three-dimensional face shape.

(3) Perform transformation and mapping on the three-dimensional face shape of the target user to obtain a rotation matrix and a translation vector corresponding to the three-dimensional face shape.

The 3D morphable model can be used to perform 3D reconstruction on a 2D face in a single video frame. Conversely, a vertice of a three-dimensional face mesh can also be mapped to a two-dimensional image plane. Transformation and mapping refer to an operation of projecting a three-dimensional face shape onto an image plane.

In an embodiment, the transformation and mapping are performed on the three-dimensional face shape of the target user to obtain a rotation matrix and a translation vector corresponding to the three-dimensional face shape. In some embodiments, a weak perspective projection model can be used for transformation and mapping. A function output g of the model on a vertice of the three-dimensional face mesh on the two-dimensional plane can be represented as:

$$g = f + Pr + R + t$$

Specifically, f represents a scale factor, Pr represents an orthogonal projection matrix, R represents a rotation matrix (Rotation Matrix), and t represents a translation vector (Translation Vector). In this way, the rotation matrix R and the translation vector t can be obtained through the above formula.

(4) Determine the head pose information based on the rotation matrix, determine the head position information based on the translation vector, and obtain the head parameter of the target user based on the head pose information and the head position information.

Considering that the head position can reversely represent a shooting position of a camera, and an angle of a head pose changes relative to a shooting angle of the camera, the neural radiance field can obtain a reason of the head pose change after learning the shooting position, and implicitly estimate a shape of shoulders and a motion status thereof based on the head pose and the shooting position of the camera, so that a character in a predicted video frame is complete and real, and motions between the head and the shoulders are kept coordinated.

In an embodiment, the rotation matrix $R \in \mathbb{R}^{3\times 3}$ can be converted into a Euler angle. The Euler angle includes three elements and represents direction information, that is, the head pose information. The translation vector with camera shooting position information is reversely represented as the head position information. Further, positional encoding is performed on the head pose information and the head position information to obtain two encoded high-dimensional vectors respectively, and the two high-dimensional vectors are connected to be represented as one vector P.

S140: Perform network training on a preset single neural radiance field based on the condition input, three-dimensional coordinates, and a viewing direction, to obtain a video generation model.

The neural radiance field in this application is configured to render an RGB value of each pixel in a video frame of a two-dimensional video. In the related art, the head and the torso of a portrait are reconstructed by using two independent neural radiance fields, but the two independent neural radiance fields generate the head and the torso of the reconstructed portrait separately, and the computing costs are relatively high, which is a defect. In addition, in the method of using independent neural radiance fields to generate the head and the torso separately, separation of network structures leads to a mismatch between the head area and the torso area, rendering the final reconstructed portrait display effect unrealistic and unnatural. Consequently, in the related art, the two neural radiance fields cannot achieve the effect of matching the head and the torso of the reconstructed portrait, and time complexity and space complexity of the algorithm also increase with the separation of the network structures.

Therefore, in this application, a simple neural radiance field is used to reconstruct the head and the torso of the portrait, so that the torso motion matches the head motion, achieving a realistic, natural, and stable display effect of the reconstructed portrait. In addition, the method greatly reduces time complexity and space complexity of the algorithm, and effectively reduces the operation cost.

In this embodiment of this application, the video generation model is obtained through training based on an overall loss. The overall loss includes an image reconstruction loss. The image reconstruction loss is determined based on a color value of a predicted object and a color value of a real object. The color value of the predicted object is generated by the single neural radiance field based on the condition input, the three-dimensional coordinates, and the viewing direction.

The mouth image area is the most difficult part to learn for the neural radiance field in the process of generating an image because the mouth shape is the part that changes most with the audio change. In addition, the mouth area is the most focused and sensitive viewing area for the viewers when watching a generated talking portrait video. Once lip motions are to some extent out of synchronization with the audio, viewers can immediately notice the case. This significantly reduces display effects of the reconstructed video.

Therefore, in this application, the lip image area is augmented to improve synchronization performance between the mouth and lips. For example, a mouth emphasis loss can be determined, the mouth emphasis loss is determined based on a color value of a predicted mouth and a color value of a real mouth, and the color value of the predicted mouth is generated by the single neural radiance field based on the condition input, the three-dimensional coordinates, and the viewing direction. Therefore, an overall loss is constructed based on the image reconstruction loss and the mouth emphasis loss jointly. In this way, with reference to the image reconstruction loss and the mouth emphasis loss, the video generation model obtained through training improves coordination between the head and shoulder motions and improves synchronization of the mouth motion, improving display realism of the reconstructed video.

When the overall loss includes the image reconstruction loss and the mouth emphasis loss, to implement the network training, three-dimensional coordinates and a viewing direction of a space sampling point on a camera ray are obtained. The camera ray is a ray emitted from a camera in capturing an image of a scene, and the camera ray corresponds to a pixel in a video frame of the training video.

In this application, the neural radiance field is used to synthesize information of space sampling points to obtain a two-dimensional view. The camera ray is a ray emitted from a camera in capturing an image of a scene, and the camera ray corresponds to a pixel in a video frames. When the camera captures an image of a three-dimensional scene, a pixel on the obtained two-dimensional image actually corresponds to a projection set of all continuous space sampling points on a camera ray emitted from the camera.

The neural radiance field predicts an RGB color value (a color value) and density information (volume density) of the space sampling point based on the input three-dimensional coordinates and viewing direction of the space sampling point. Therefore, the three-dimensional coordinates and the viewing direction of the sampling point on the camera ray needs to be known.

In an embodiment, the three-dimensional coordinates $x=(x, y, z)$ and the viewing direction $d=(\theta, \phi)$ of the space sampling point may be preset. Specifically, because the position of the space sampling point determines the position of the pixel in the final two-dimensional plane image, the three-dimensional coordinates of the space sampling point can be set based on the position information of the pixel on the two-dimensional plane image. For example, pixel coordinates can be converted into the three-dimensional coordinates of the space sampling point on the camera ray in unified world coordinates based on internal and external parameters of the camera. Further, a viewing direction may be determined based on a preset shooting angle of the camera when shooting a scene. Alternatively, the viewing direction may be set in advance based on an observation angle of a character in an obtained reference video.

The network training is performed on the preset single neural radiance field based on the condition input, the three-dimensional coordinates, and the viewing direction. For a specific process, refer to the following steps.

In some embodiments, the performing network training on a preset single neural radiance field based on the condition input, three-dimensional coordinates, and a viewing direction includes the following steps:

(1) Perform temporal smoothing processing on the phonetic feature and the expression parameter to obtain a smooth phonetic feature and a smooth expression parameter.

Because the expression parameter of each video frame is obtained separately, temporal discontinuity exists between two adjacent video frames. Similarly, the same problem occurs to the phonetic feature, and causes jittery images, frame skipping, and unsmooth sound in the generated reconstructed video. To make the final generated reconstructed video more stable, temporal smoothing processing may be performed on the phonetic feature and the expression parameter respectively.

In an embodiment, two temporal smoothing networks (Temporal Smoothing Network) may be separately used to filter a phonetic feature a and an expression parameter e. For example, performing temporal smoothing processing on the expression parameter e includes: in a time dimension, calculating the smooth expression parameter of the video frame at a moment t based on a linear combination of the expression parameter e of each video frame at a time step from t−T/2 to t+T/2. T is a time interval. A weight of the linear combination can be calculated using the expression parameter e as an input of the temporal smoothing network. The temporal smoothing network includes five one-dimensional convolutions, followed by a linear layer with softmax activation.

In the time dimension, the smooth phonetic feature of the video frame at the moment t is calculated based on the linear combination of the phonetic feature a of each video frame at the time step from t−T/2 to t+T/2. A weight of the linear combination can be calculated using the phonetic feature a as an input of the temporal smoothing network.

(2) Input the three-dimensional coordinates, the viewing direction, the smooth phonetic feature, the smooth expression parameter, and the head parameter to the preset single neural radiance field, and calculate the predicted color value and the volume density corresponding to the space sampling point.

In an embodiment, the single neural radiance field calculates a predicted color value c and a volume density σ of each space sampling point based on the three-dimensional coordinates, the viewing direction, the smooth phonetic feature, the smooth expression parameter, and the head parameter of the space sampling point. Specifically, the neural network of the single neural radiance field can be a multi-layer perceptron (Multi-Layer Perceptron, MLP), represented by an implicit function $F_\theta$:

$$F_\theta: (x, d, a, e, p) \rightarrow (c, \sigma)$$

An input of the implicit function $F_\theta$ (the single neural radiance field) includes three-dimensional coordinates x, a viewing direction d, a smooth phonetic feature a, a smooth expression parameter e, and a head parameter p. An output of the function $F_\theta$ is the predicted color value c and the volume density σ corresponding to the space sampling point.

Figure 3:
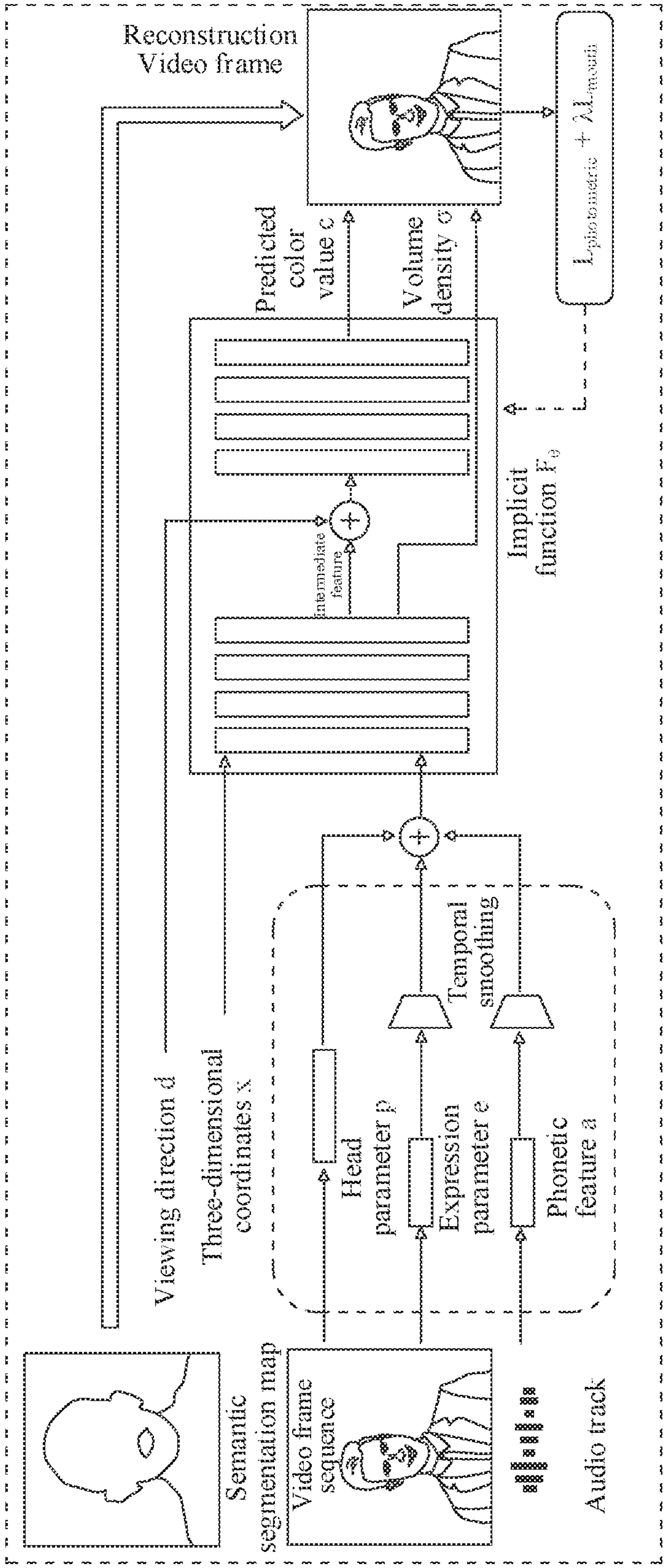
FIG. 3 is a network architectural diagram of a single neural radiance field according to an embodiment of this application.

FIG. 3. is a diagram of a network architecture of a single neural radiance field. The single neural radiance field can be a multi-layer perceptron composed of eight perceptual layers. As shown in FIG. 3, a video frame sequence of the training video is obtained. The video frame sequence is associated with an audio track (audio data). In a possible implementation, a three-dimensional morphable model can be used to perform three-dimensional face reconstruction on each video frame to obtain the expression parameter e, the head pose information, and the head position information, and determine the head parameter p based on the head pose information and the head position information. DeepSpeech is used to extract the phonetic feature a from the audio track.

Then, the temporal smoothing processing is performed on the expression parameter and the phonetic feature respectively to obtain a smooth phonetic feature and a smooth expression parameter. The smooth phonetic feature, the smooth expression parameter, and the head parameter p are used as the condition input, and are input to the neural radiance field (implicit function $F_\theta$) in combination with the three-dimensional coordinates x and the viewing direction d.

In a possible implementation, the neural radiance field can predict the volume density and an intermediate feature corresponding to the space sampling points based on the condition input and the three-dimensional coordinates x, and predict the predicted color value corresponding to the space sampling point based on the intermediate feature and the viewing direction d. Then, based on the predicted color value c and the volume density σ corresponding to the space sampling point, a complete image of the coordinated head-torso motions is generated, that is, the reconstructed video frame is generated. The single neural radiance field is trained based on the image reconstruction loss and the mouth emphasis loss. The mouth emphasis loss is calculated using a pre-obtained semantic segmentation map corresponding to the mouth area, and the intermediate feature is generated during the calculation process of the neural radiance field.

(3) Determine an image reconstruction loss corresponding to an entire image area of the video frame for the video frame of the training video frame and based on the predicted color value and the volume density, and determine a mouth emphasis loss corresponding a mouth image area of the video frame based on the predicted color value and the volume density.

The mouth image area is the most difficult part to learn for the neural radiance field in the process of generating an image because the mouth shape is the part that changes most with the audio change. In addition, the mouth area is the most focused and sensitive viewing area for the viewers when watching a generated talking portrait video. Once lip motions are to some extent out of synchronization with the audio, viewers can immediately notice the case. This significantly reduces display effects of the reconstructed video.

Therefore, in this application, the lip image area is augmented to improve synchronization performance between the mouth and lips. A semantic segmentation map of the mouth area is obtained from each video frame, a ray emitted from the mouth part is found in each iteration, and the ray is given a great weight in the process of calculating the mouth emphasis loss after rendering. The image reconstruction loss can also guide the neural radiance field to learn color information of the entire image area, that is, the color value of the pixel. In addition, the shoulder motion status can be estimated based on the head parameter. In this way, with reference to the image reconstruction loss and the mouth emphasis loss, the video generation model obtained through training improves coordination between the head and shoulder motions and improves synchronization of the mouth motion, improving display realism of the reconstructed video.

In an embodiment, the determining an image reconstruction loss corresponding to an entire image area of the video frame based on the predicted color value and the volume density, includes:

(3.1) Perform color integration on camera rays in the entire image area based on the predicted color value and the volume density, and predict a color value of a predicted object corresponding to each camera ray in the entire image area.

In an embodiment of this application, the neural radiance field obtains the color information and the density information of a three-dimensional space sampling point. When the camera captures an image of the scene, a pixel on the obtained two-dimensional image actually corresponds to all continuous space sampling points on a camera ray emitted from the camera. Therefore, it is necessary to obtain a color value of this camera ray finally rendered on the two-dimensional image based on all space sampling points on this camera ray.

Figure 4:
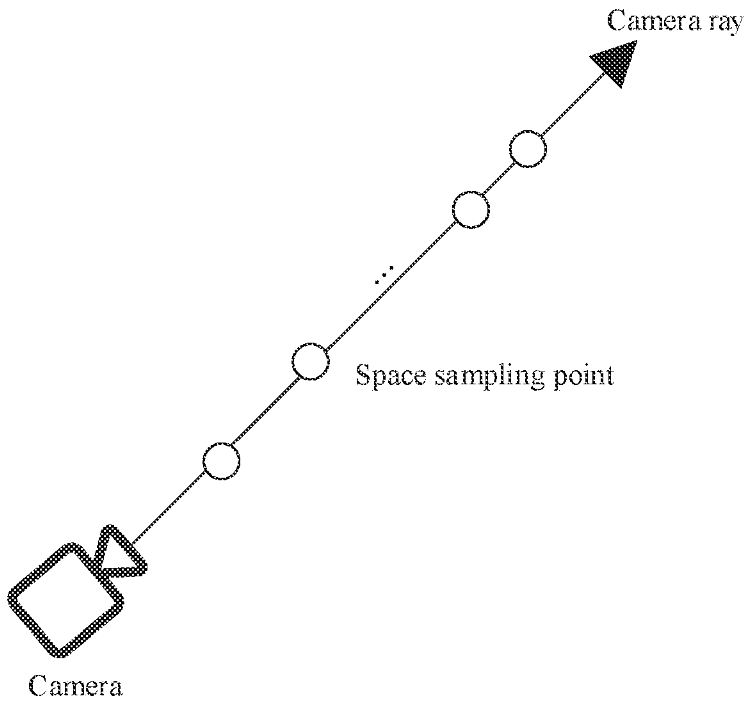
FIG. 4 is a schematic diagram of a camera ray according to an embodiment of this application.

In addition, volume density (Volume Density) can be understood as a probability that a camera ray r is terminated when passing an infinitesimal particle at the location x of a space sampling point. This probability is differentiable, which means the opacity of this space sampling point. Because the space sampling points on a camera ray are continuous, the color value of the pixel corresponding to this camera ray on the two-dimensional image can be obtained by integration. FIG. 4 shows a schematic diagram of a camera ray. The camera ray (Ray) can be marked as r(t)=o+td. o represents the origin of the camera ray, d represents the angle of the camera ray, and the near boundary and the far boundary on the camera ray t are separately represented as $t_n$ and $t_f$.

In a possible implementation, based on the predicted color value and volume density, color integration is performed on the camera rays in the entire image area of the video frame. A manner of predicting a color value of a predicted object corresponding to each camera ray in the entire image area may be obtaining a cumulative transparency degree corresponding to each space sampling point on the camera ray in the entire image area, the cumulative transparency degree being generated by performing integration based on a volume density of the camera ray in a first integration interval; determining an integrand based on a product of the cumulative transparency degree, the predicted color value, and the volume density; and performing color integration on the integrand in a second integration interval, and predicting a color value of a predicted object corresponding to each camera ray in the entire image area, the first integration interval being a sampling distance of the camera ray from a near boundary to the space sampling point, and the second integration interval being a sampling distance of the camera ray from the near boundary to a far boundary.

Specifically, the cumulative transparency degree T(t) corresponding to the space sampling point on each camera ray in the entire image area of the video frame of the training video is obtained. The cumulative transparency degree can be understood as a probability that the camera ray does not hit any particle in the first integration interval. The cumulative transparency degree can be generated by performing integration based on the volume density of the camera ray in the first integration interval, the first integration interval is a sampling distance of the camera ray from the near boundary $t_n$ to the space sampling point t, and the integration formula is as follows:

$$T(t) = \exp\left(-\int_{t_n}^{t} \sigma(r(s))ds\right)$$

Then, the integrand is determined based on the product of the cumulative transparency degree T(t), the predicted color value, and the volume density, and the color integration is performed on the integrand in the second integration interval to predict a color value C(r) of a predicted object corresponding to each camera ray in the entire image area. r(s) represents the camera ray, the second integration interval is the sampling distance of the camera ray from the near boundary $t_n$ to the far boundary $t_f$, and the color integration may be represented as:

$$C(r) = \int_{t_n}^{t_f} T(t)\cdot\sigma(t)\cdot c(r(t), d)dt$$

(3.2) Determine, based on the color value of the predicted object and a color value of a corresponding real object corresponding to each camera ray in the entire image area, the image reconstruction loss corresponding to the entire image area.

After obtaining the color value of the predicted object, the image reconstruction loss corresponding to the entire image area can be determined based on the color value C(r) of the predicted object and the color value $\hat{C}(r)$ of the corresponding real object that correspond to each camera ray in the entire image area. In a possible implementation, the image reconstruction loss can be constructed based on a mean square error (Mean Square Error, MSE):

$$L_{photometic} = \sum_{r\in R}\left\|\hat{C}(r) - C(r)\right\|^2$$

R is a camera ray set, which contains the camera rays on the entire image area. Original color values of pixels in the entire area of the video frame in the training video can be used as the color value of the real object (Ground-truth) of the camera ray corresponding to the pixel.

In an embodiment, the step of determining, based on the predicted color value and volume density, a mouth emphasis loss corresponding to a mouth image area of the video frame may include the following steps:

(3.1) Perform image semantic segmentation on the video frame to obtain the mouth image area corresponding to the video frame.

(3.2) Perform color integration on camera rays in the mouth image area based on the predicted color value and the volume density, and predict a color value of a predicted mouth corresponding to each camera ray in the mouth image area.

(3.3) Determine the mouth emphasis loss corresponding to the mouth image area based on the color value of the predicted mouth and a color value of a real mouth corresponding to each camera ray in the mouth image area.

In an embodiment of this application, to determine the mouth emphasis loss, an image semantic segmentation is performed on the video frame of the training video to obtain the mouth image area corresponding to the video frame. Color integration is performed on the camera rays in the mouth image area of the video frame based on the predicted color value and the volume density. A color value of the predicted mouth corresponding to each camera ray in the mouth image area is predicted.

The mouth emphasis loss corresponding to the mouth image area is determined based on the color value of the predicted mouth and a color value of a real mouth corresponding to each camera ray in the mouth image area:

$$L_{mouth} = \sum_{r\in R_{mouth}}\left\|\hat{C}(r) - C(r)\right\|^2$$

$R_{mouth}$ is a camera ray set, and the set contains the camera rays on the mouth image area. An original color value of a pixel in the mouth area on the video frame in the training video can be used as the color value of the real mouth (Ground-truth) of the camera ray corresponding to the pixel.

(4) Construct the overall loss with reference to the image reconstruction loss and the mouth emphasis loss, and perform the network training on the single neural radiance field based on the overall loss.

To emphasize the training of the mouth area, this application multiplies the mouth emphasis loss $L_{mouth}$ by an additional weight coefficient and adds it to the image reconstruction loss $L_{photometic}$ to form the overall loss, to perform network training on the single neural radiance field.

In an embodiment, the step of constructing the overall loss with reference to the image reconstruction loss and the mouth emphasis loss, and performing the network training on the single neural radiance field based on the overall loss may include the following steps:

(4.1) Obtain a weight coefficient.

For the weight parameter, an optimal value may be selected based on training experience during the network training experiment. The weight coefficient $\lambda>0$.

(4.2) Determine the overall loss based on the image reconstruction loss, the weight coefficient, and the mouth emphasis loss.

The mouth emphasis loss $L_{mouth}$ is multiplied by the additional weight coefficient $\lambda$ and added to the image reconstruction loss $L_{photometic}$ to form the overall loss:

$$L = L_{photometic} + \lambda L_{mouth}$$

(4.3) Perform iterative training on the single neural radiance field based on the overall loss until the single neural radiance field meets a preset condition.

After the overall loss is obtained, the single neural radiance field can be iteratively trained based on the overall loss until the single neural radiance field meets a preset condition. The preset condition can be: The overall loss value of the overall loss function L is less than a preset value, the overall loss value of the overall loss function L no longer changes, the number of training times reaches a preset number, or the like. In some embodiments, an optimizer may be used to optimize the overall loss function L, and a learning rate (Learning Rate), a training batch size (Batch Size), and a training period (Epoch) are set based on experimental experience.

When the network training on the single neural radiance field meets the preset condition, the single neural radiance field that meets the preset condition can be used as a video generation model. This video generation model can be used to perform object reconstruction on a target video of the target user to obtain a reconstructed video at last.

In an embodiment, a target video of the target user may be obtained, and object reconstruction is performed on the target video based on the video generation model to obtain a corresponding reconstructed video of the target user. The target video includes at least a conference video in a video conference, a live video during livestreaming, a pre-recorded video, and the like. This is not limited herein.

In a possible implementation, a manner of performing object reconstruction on the target video based on the video generation model to obtain a corresponding reconstructed video of the target user may be: obtaining a preset number of target video frames from the target video. The preset number of frames may be determined by computing performance of a computer device currently performing object reconstruction.

Each target video frame is input into the video generation model, and the reconstructed video frame of each target video frame is correspondingly predicted from the video generation model. Because the video generation model introduces the head pose information and the head position information when reconstructing the video frame, an appropriate shoulder shape can be estimated to adapt to changes in head statuses and positions. This makes the shoulders and head of the generated character image displayed on the overall video frame more natural, stable and coordinated in an entire video frame. A corresponding reconstructed video of the target user is obtained through synthesization based on all the calculated reconstructed video frames.

In this embodiment of this application, the phonetic feature of the target user, the expression parameter of the target user, and the head parameter of the target user are extracted from the training video of the target user. The head parameter is used for representing the head pose information and the head position information of the target user. The phonetic feature, expression parameter, and head parameter are synthesized to obtain the condition input of the training video. The network training is performed on the preset single neural radiance field based on the condition input, the three-dimensional coordinates, and the viewing direction to obtain the video generation model. In this way, by introducing the head pose information and the head position information into the condition input, the video generation model can give a facial expression to the reconstructed portrait after considering the head motion, so that the reconstructed portrait has a high resolution, improving clarity of the reconstructed image. In addition, the shoulder motion state can be implicitly estimated based on the head pose information and the head position information, so that the generated reconstructed portrait can not only maintain the coordination between the head motion and the shoulder motion, but enable completeness of the head and shoulders of the reconstructed portrait.

In addition, the video generation model can be obtained through training based on the image reconstruction loss and the mouth emphasis loss. The image reconstruction loss is determined by the single neural radiance field based on the color value of the predicted object generated based on the condition input and the color value of the real object. The mouth emphasis loss is determined by the single neural radiance field based on the color value of the predicted mouth generated by the condition input and the color value of the real mouth.

Because the color value is related to the position of the space sampling point and the viewing direction, the image reconstruction loss can guide the single neural radiance field to predict different lighting effects at the space sampling point from different perspectives. Finally, the color integration can be used to make the pixel corresponding to the camera ray more colorful, enhancing a display effect of the reconstructed video. When the object reconstruction is performed on the target video of the target user based on the video generation model, the obtained reconstructed video can be synchronized with the mouth motion of the target video, the changes in the mouth shape and audio can be accurately matched, and the coordination between the head motion and the shoulder motion of the reconstructed portrait can be maintained, greatly improving display realism of the reconstructed video.

With reference to the method described in the foregoing embodiments, the following further provides detailed description by using examples.

Figure 5:
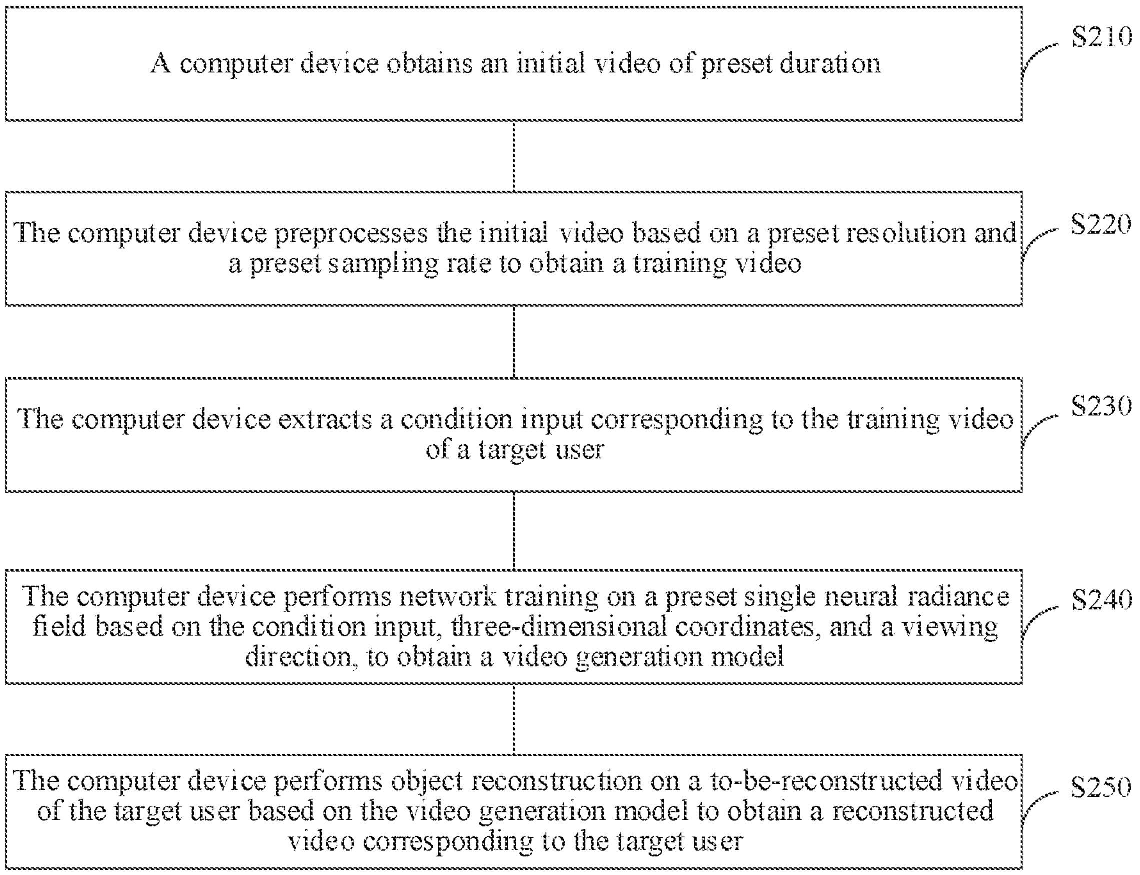
FIG. 5 is a schematic flowchart of another method for training a video generation model according to an embodiment of this application.

The following uses an example in which an apparatus for training a video generation model is specifically integrated in a computer device to provide descriptions. A detained illustration is given for the flowchart in FIG. 5 with reference to the application scenario in FIG. 6. The computer device may be a server, a terminal, or the like. FIG. 5 is another method for training a video generation model according to an embodiment of this application. In a specific embodiment, the method for training a video generation model can be applied to a video conference scenario in FIG. 6.

A video conference service provider provides a service end, and the service end includes a cloud training server 410 and a cloud execution server 430. The cloud training server 410 is configured to train a video generation model for object reconstruction, and the cloud execution server 430 is configured to deploy a video generation model for object reconstruction, a computer program for video conference-related functions, and transmit a generated reconstructed video to a client end. The client end may include a video conference software 421 enabled on a smart TV 420 when the receiver uses the video conference service, and a video conference software 441 enabled on a notebook computer 440 when the sender uses the video conference service.

In the above video conference scenarios, the sender and the receiver conduct video conference through their respective video conference software, that is, the client end. Due to personal reasons, the sender can use the object reconstruction function on the video conference software 441 to reconstruct his or her real portrait, and a reconstructed ideal portrait is shown on the video conference software 421 of the receiver. The reconstruction of the portrait is completed by the cloud execution server 430 on the server end using the video generation model.

Figure 6:
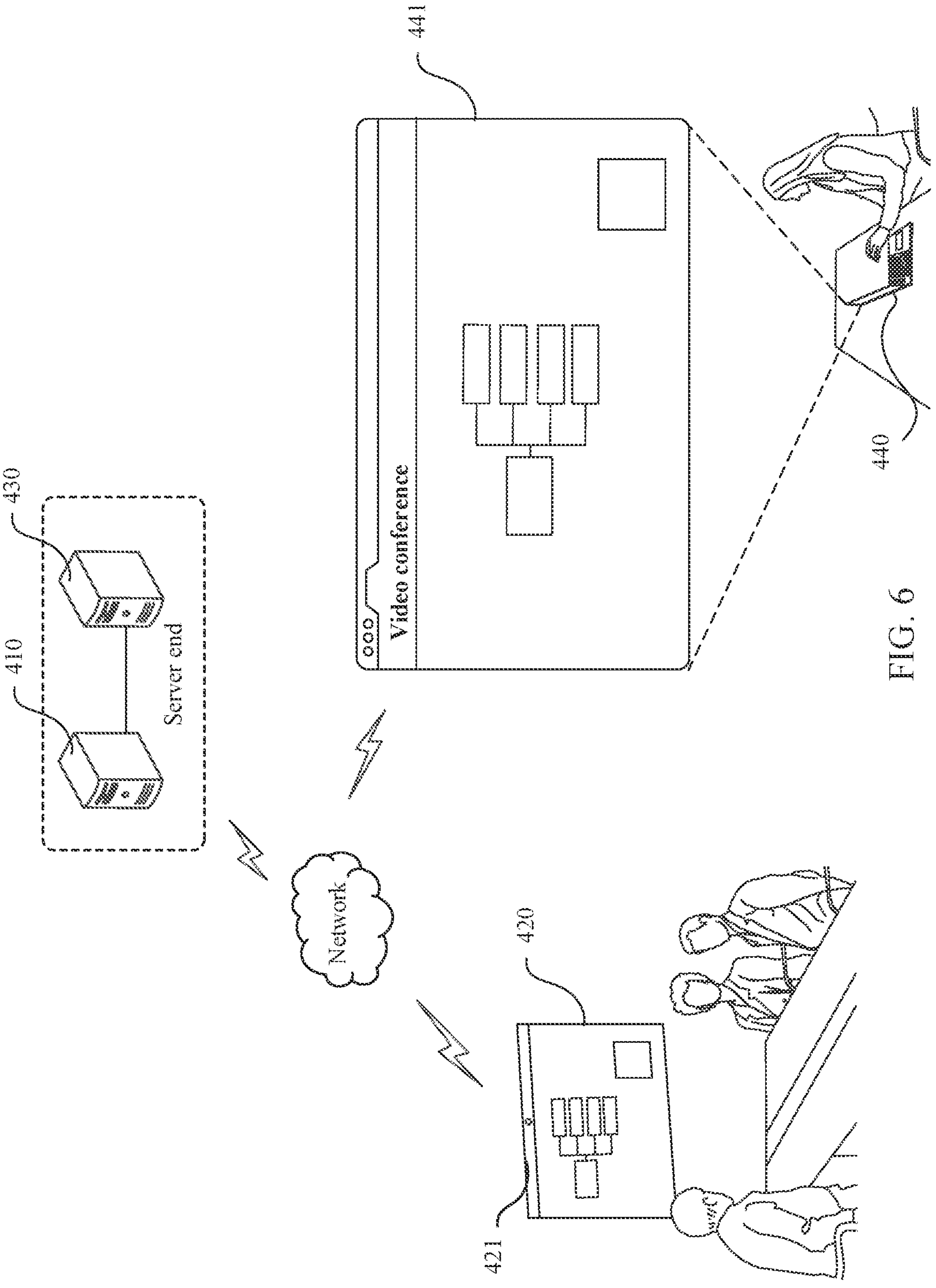
FIG. 6 is a schematic diagram of an application scenario according to an embodiment of this application.

FIG. 6 is merely an application scenario according to an embodiment of this application. The application scenario described in this embodiment of this application is to illustrate the technical solutions of this embodiment of this application more clearly, but does not constitute a limitation on the technical solutions provided in this embodiment of this application. For example, in other cases, reconstruction of a real portrait in FIG. 6 can also be completed directly on the video conference software 441, and the cloud execution server 430 can transmit the reconstructed portrait video generated by the video conference software 441 to the video conference software 421. A person of ordinary skill in the art may know that as a system architecture evolves and a new applied scenario (for example, video chatting and live streaming) emerges, the technical solutions provided in the embodiments of this application are also applicable to a similar technical problem. The method for training a video generation model may specifically include the following steps:

S210: A computer device obtains an initial video of preset duration.

The initial video records audio content of the target user talking. Considering that the related art cannot learn the 3D geometry of the scene during the network learning process, additional reference images are needed to provide identity information for network learning. In this application, a segment of video of a specific person, that is, the initial video of the preset duration is obtained as training data, which can be used for network learning of video reconstruction, avoiding use of excessive training data and improving efficiency of network training.

For example, the sender can use a pre-recorded talking video with preset duration of five minutes as the initial video, and transmit the initial video to the cloud training server 410 through the video conference software 441 for preprocessing. In some embodiments, the video conference software 441 can also directly preprocess the initial video to obtain a training video, and send the training video to the cloud training server 410.

S220: The computer device preprocesses the initial video based on a preset resolution and a preset sampling rate to obtain the training video.

To allow a character area in the generated reconstructed video to occupy the center of the screen and improve the viewer's comfort level when watching the video, in this application, the portrait of the target user in the initial video can be anchored in a central area in the video frame of the training video through preprocessing during the network training phase, so that in the reconstructed video generated by the video generation model through training, the character area can occupy the center of the video screen.

The preset resolution and the preset sampling rate can be set based on the display requirements of the character content in the video screen in an actual application scenario. For example, after receiving the initial video sent by the video conference software 441, the cloud training server 410 may sample the initial video based on a sampling frequency of 25 fps, and crop the sampled video frame from the initial video based on a resolution of 450×450 pixels to obtain a training video, so that the portrait of the target user occupies the central area of the video frame.

S230: The computer device extracts the condition input corresponding to the training video of the target user.

In this application, the head pose information and the head position information of the user are introduced into the condition input, so that the neural radiance field can implicitly estimate the motion state of the shoulder based on the head pose information and the head position information, enabling the generated reconstructed portrait to maintain coordination between the head motion and the shoulder motion.

In an embodiment of this application, a manner of obtaining the condition input corresponding to the training video of the target user includes: obtaining the training video; extracting a phonetic feature of the target user, an expression parameter of the target user, and a head parameter of the target user from the training video, the head parameter being used for representing the head pose information and the head position information of the target user; and synthesizing the phonetic feature of the target user, the expression parameter of the target user, and the head parameter of the target user to obtain the condition input of the training video.

In some embodiments, the step of extracting, by the computer device, a phonetic feature of the target user, an expression parameter of the target user, and a head parameter of the target user from the training video includes the following steps:

(1) The computer device performs phonetic feature extraction on the training video of the target user to obtain the phonetic feature.

For example, when obtaining the training video, the cloud training server 410 can use a DeepSpeech model to learn speech-to-text mapping in the training video, that is, to extract the phonetic feature in the talking voice content of the target user. Specifically, the cloud training server 410 can sample the audio data associated with the training video to obtain a sample array, perform a fast Fourier transform on the sample array, and perform two-layer convolution calculation on this basis to obtain convolved data.

The cloud training server 410 performs a Shape operation on the convolved data, performs a slicing operation on the operated data to obtain a preset number of data pieces, inputs each data piece into each RNN layer respectively, obtains output data corresponding to each RNN layer, and performs a combination operation on the output data to obtain a phonetic feature a corresponding to the audio data.

(2) The computer device performs three-dimensional face reconstruction on the training video of the target user to obtain a face shape representation of a three-dimensional face shape of the target user, and determines the expression parameter of the target user based on the face shape representation.

For example, the cloud training server 410 can use a three-dimensional morphable model to obtain an expression parameter from each video frame. The three-dimensional morphable model can perform three-dimensional reconstruction on a two-dimensional face in a single video frame to obtain a corresponding three-dimensional face shape representation $$v = \bar{v} + E^s s + E^e e, v \in \mathbb{R}^{3N}.$$

$\bar{v}$ represents an average value calculated on a selected face dataset. $E^s$ and $E^e$ respectively represent a matrix of orthogonal basis vectors of shape space and expression space. s and e respectively represent a shape coefficient and an expression coefficient. Further, the expression coefficient e may be used as the expression parameter of a reconstructed three-dimensional face shape.

(3) The computer device performs transformation and mapping on the three-dimensional face shape of the target user to obtain a rotation matrix and a translation vector corresponding to the three-dimensional face shape.

For example, the cloud training server 410 can perform transformation and mapping on the three-dimensional face shape of the target user to obtain a rotation matrix and a translation vector corresponding to the three-dimensional face shape. In some embodiments, the transformation and mapping can use a weak perspective projection model. A function output of the model on a vertice of a three-dimensional face mesh on a two-dimensional plane can be represented as: g=f+Pr+R+t. f represents a scale factor, Pr represents an orthogonal projection matrix, R represents a rotation matrix, and t represents a translation vector.

(4) The computer device determines the head pose information based on the rotation matrix, determines the head position information based on the translation vector, and obtains the head parameter of the target user based on the head pose information and the head position information.

For example, the cloud training server 410 can converts the rotation matrix into a Euler angle, and the Euler angle includes three elements and represents direction information, that is, the head pose information. The translation vector is represented as the head position information. Further, positional encoding is performed on the head pose information and the head position information to obtain two encoded high-dimensional vectors, and the two high-dimensional vectors are connected to be represented as one vector P.

S240: The computer device performs network training on a preset single neural radiance field based on the condition input, three-dimensional coordinates, and a viewing direction, to obtain a video generation model.

The method for training a video generation model according to this embodiment of this application includes training of a preset single neural radiance field. The training of the preset single neural radiance field can be pre-conducted based on an obtained training sample data set. Subsequently, each time object reconstruction needs to be performed, the trained video generation model can be used to directly perform calculation without performing the network training each time object reconstruction is performed.

In some embodiments, the performing, by the computer device, network training on a preset single neural radiance field based on the condition input, three-dimensional coordinates, and a viewing direction includes:

(1) The computer device performs temporal smoothing processing on the phonetic feature and the expression parameter to obtain a smooth phonetic feature and a smooth expression parameter.

For example, the cloud training server 410 can use two temporal smoothing networks to filter a phonetic feature a and an expression parameter e respectively. For example, performing temporal smoothing processing on the expression parameter e includes: in a time dimension, calculating the smooth expression parameter of the video frame at a moment t based on a linear combination of the expression parameter e of each video frame at a time step from t−T/2 to t+T/2. A weight of the linear combination can be calculated using the expression parameter e as an input of the temporal smoothing network. The temporal smoothing network includes five one-dimensional convolutions, followed by a linear layer with softmax activation.

For example, in the time dimension, the cloud training server 410 can calculate the smooth phonetic feature of the video frame at the moment t based on the linear combination of the phonetic feature a of each video frame at a time step from t−T/2 to t+T/2. A weight of the linear combination can be calculated using a phonetic feature t as an input of the temporal smoothing network.

(2) The computer device obtains the three-dimensional coordinates and the viewing direction of the space sampling point on the camera ray.

For example, the cloud training server 410 may convert pixel coordinates into the three-dimensional coordinates of the space sampling point on the camera ray in unified world coordinates based on internal and external parameters of a camera. The cloud training server 410 may determine a viewing direction based on a preset shooting angle of the camera when shooting a scene, or set a viewing direction in advance based on an observation angle of a character in a pre-obtained reference video.

(3) The computer device inputs the three-dimensional coordinates, the viewing direction, the smooth phonetic feature, the smooth expression parameter, and the head parameter to the preset single neural radiance field, and calculates a predicted color value and a volume density corresponding to the space sampling points.

For example, the cloud training server 410 may use, based on an implicit function $F_\theta$, the three-dimensional coordinates x and the viewing direction d of the space sampling points, the smooth phonetic feature a, the smooth expression parameter e, and the head parameter p as function inputs, so that the implicit function $F_\theta$ calculates a predicted color value c and a volume density $\sigma$ of each space sampling point. The implicit function $F_\theta$ is represented as $F_\theta$: (x, d, a, e, p)→(c, $\sigma$).

(4) The computer device determines an image reconstruction loss corresponding to an entire image area of the video frame for the video frame of the training video frame and based on the predicted color value and the volume density, and determines a mouth emphasis loss corresponding a mouth image area of the video frame based on the predicted color value and the volume density.

In an embodiment, the step of determining an image reconstruction loss corresponding to an entire image area of the video frame of the training video may include the following steps:

(4.1) The computer device performs color integration on camera rays in the entire image area of the video frame based on the predicted color value and the volume density, and predicts a color value of a predicted object corresponding to each camera ray in the entire image area.

For example, the cloud training server 410 may obtain a cumulative transparency degree corresponding to the space sampling point on each camera ray in the entire image area. The cumulative transparency degree can be understood as a probability that the camera ray does not hit any particle in a first integration interval. The cumulative transparency degree can be generated by performing integration based on the volume density of the camera ray in the first integration interval, the first integration interval being a sampling distance of the camera ray from a near boundary to the space sampling point.

The cloud training server 410 may determine an integrand based on a product of the cumulative transparency degree, the predicted color value, and volume density, perform color integration on the integrand in a second integration interval to predict a color value of a predicted object corresponding to each camera ray in the entire image area. The second integration interval is a sampling distance of the camera ray from a near boundary to a far boundary.

The cloud training server 410 may determine the image reconstruction loss corresponding to the entire image area based on the color value of the predicted object and a color value of a corresponding real object corresponding to each camera ray in the entire image area. In some embodiments, the image reconstruction loss can be constructed based on a mean square error. An original color value of a pixel in the entire area of the video frame in the training video can be used as the color value of the real object of the camera ray corresponding to the pixel.

(4.2) The computer device determines the image reconstruction loss corresponding to the entire image area based on the color value of the predicted object and the color value of the corresponding real object corresponding to each camera ray in the entire image area.

In an embodiment, the step of determining, based on the predicted color value and volume density, the mouth emphasis loss corresponding to the mouth image area of the video frame may include the following steps:

(4.1) Perform image semantic segmentation on the video frame to obtain the mouth image area corresponding to the video frame.

(4.2) Perform color integration on camera rays in the mouth image area based on the predicted color value and the volume density, and predict a color value of a predicted mouth corresponding each camera ray in the mouth image area.

(4.3) Determine the mouth emphasis loss corresponding to the mouth image area based on the color value of the predicted mouth and a color value of a real mouth corresponding to each camera ray in the mouth image area.

For example, the cloud training server 410 may perform image semantic segmentation on the video frame of the training video to obtain the mouth image area corresponding to the video frame, perform color integration on the camera ray in the mouth image area of the video frame based on the predicted color value and the volume density, and predict a color value of the predicted mouth corresponding to each camera ray in the mouth image area.

The cloud training server 410 may determine the mouth emphasis loss corresponding to the mouth image area based on the color value of the predicted mouth and the color value of the real mouth corresponding to each camera ray in the mouth image area. The original color value of the pixel in the mouth area of the video frame in the training video can be used as the color value of the real mouth of the camera ray corresponding to the pixel.

(5) The computer device constructs the overall loss with reference to the image reconstruction loss and the mouth emphasis loss, and performs the network training on the single neural radiance field based on the overall loss.

To emphasize the training of the mouth area, this application multiplies the mouth emphasis loss by an additional weight coefficient and adds it to the image reconstruction loss to form the overall loss to perform network training on the single neural radiance field.

For example, the cloud training server 410 may obtain the weight coefficient and determine the overall loss based on the image reconstruction loss, the weight coefficient, and the mouth emphasis loss. Iterative training is further performed on the single neural radiance field based on the overall loss until the single neural radiance field meets a preset condition.

In a possible implementation, to quantitatively analyze performance of the video generation model in this application, the method for training a video generation model can be compared with related arts (Baselines) on two test sets. Test set A and test set B are both talking portrait videos. The related arts include MakeItTalk, AD-NeRF, Wav2Lip, and NerFACE. Metrics (Metrics) include: PSNR and SSIM, used to evaluate quality of reconstructed video frames (such as facial expressions); LPIPS, configured to measure quality of realism; LMD, configured to evaluate accuracy of the mouth shape; and Sync, configured to evaluate synchronization between the lip and audio.

For test set A and test set B, the evaluation indicators of PSNR, SSIM, and LPIPS are calculated in the entire image area, and the evaluation indicators of LMD and Sync are calculated in the mouth image area. The calculation results are shown in Table 1 below:

TABLE 1

| Dataset | Method | PSNR↑ | SSIM↑ | LPIPS↓ | LMD↓ | Sync↑ |
|---|---|---|---|---|---|---|
| Test Set A | Ground Truth | N/A | 1.0000 | 0.0000 | 0.0000 | 8.136 |
| | MakeItTalk | 30.4674 | 0.8005 | 0.3405 | 3.6667 | 5.548 |
| | Wav2Lip | 30.8485 | 0.8037 | 0.3271 | 3.6711 | 9.579 |
| | AD-NeRF | 34.3550 | 0.9467 | 0.0902 | 1.9554 | 3.797 |
| | NerFACE | 33.0155 | 0.9096 | 0.1618 | 1.3182 | 7.324 |
| | This application | 35.1648 | 0.9573 | 0.0799 | 1.0911 | 7.664 |
| Test Set B | Ground Truth | N/A | 1.0000 | 0.0000 | 0.0000 | 4.838 |
| | MakeItTalk | 31.4489 | 0.8619 | 0.1853 | 2.8742 | 3.123 |
| | Wav2Lip | 32.1374 | 0.8693 | 0.1482 | 3.0038 | 7.056 |
| | AD-NeRF | 35.3661 | 0.9444 | 0.0776 | 1.8903 | 3.791 |
| | NerFACE | 35.2226 | 0.9389 | 0.0911 | 1.4402 | 3.812 |
| | This application. | 36.3226 | 0.95317 | 0.0631 | 1.3664 | 3.955 |

According to Table 1, it can be seen that on the two test sets, the method proposed in this application achieves the best performance in the evaluation indicators PSNR, SSIM, LPIPS and LMD. In addition, the method is also superior in audio-lip synchronization and accuracy. For example, it can be observed that the human portraits in the reconstructed video frame created by the method of this application have more accurate facial expressions, higher lip synchronization accuracy, and more natural head-torso coordination.

The generative capability of AD-NeRF depends on using two independent neural radiance fields to model the head and torso. This inevitably causes problems of separation and shaking in the portrait neck. The difference is that this application introduces detailed head pose information and head position information as a condition input based on the single neural radiance field, and more accurate visual details can be generated. For example, a facial expression is better than one in AD-NeRF.

Figure 7:
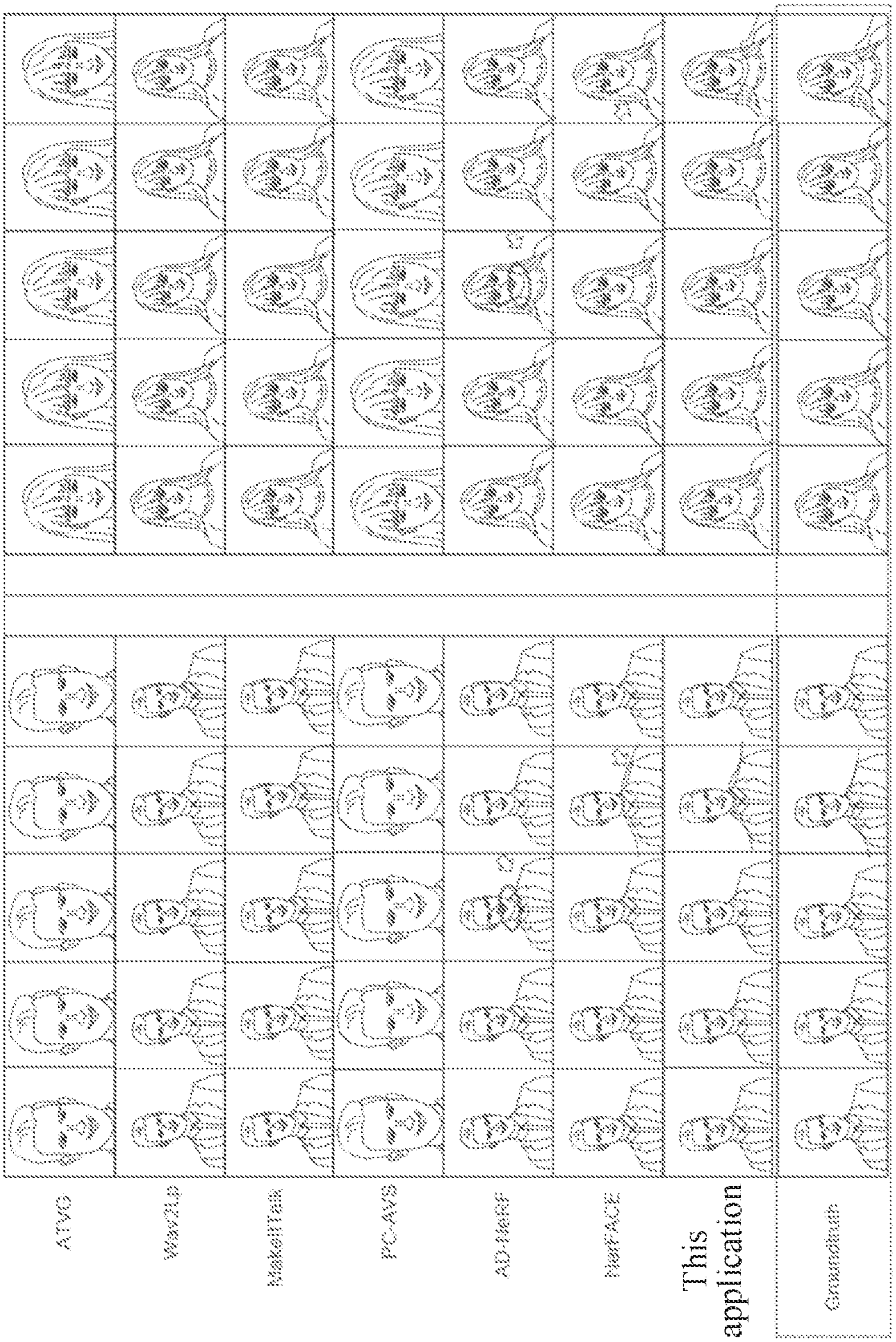
FIG. 7 is a schematic diagram of performance comparison according to an embodiment of this application.

In a possible implementation, to qualitatively analyze performance of the video generation model in this application, this method for training a video generation model can be visually compared with related arts on the two test sets, that is, the reconstructed video frames generated by various methods are compared side by side. The related arts include MakeItTalk, AD-NeRF, Wav2Lip, ATVG, PC-AVS, and NerFACE. FIG. 7 is a schematic diagram of performance comparison. This schematic diagram is an example diagram obtained after processing.

It can be observed from FIG. 7 that compared with the generative adversarial networks (ATVG, Wav2lip, MakeIt-Talk, PC-AVS)-based methods, this application can generate a clearer and more complete talking portrait, which has more realistic image quality and more accurate expression recovery. Observing generation results of prior NeRF-based methods (AD-NeRF, NerFACE), AD-NeRF has a head-shoulder separation problem, and NerFACE has a head-shoulder incoordination problem caused by rigid modeling of the head and shoulders, causing over-rotation in shoulders along with changes in head pose. Compared with the human portraits generated by AD-NeRF and NerFACE, the human portrait in the reconstructed video frames generated in this application are complete and coordinated, and has a strong sense of reality.

S250: The computer device performs object reconstruction on the target video of the target user based on the video generation model to obtain the reconstructed video corresponding to the target user.

When the network training on a single neural radiance field performed by the cloud training server 410 meets a preset condition, the single neural radiance field that meets the preset condition can be deployed on the cloud execution server 430 as a video generation model. Therefore, the cloud execution server 430 can perform object reconstruction on the target video of the target user based on the video generation model to obtain a reconstructed video at last.

For example, the cloud execution server 430 can obtain a to-be-reconstructed conference video, that is, the target video transmitted by the sender through the video conference software 441 on the notebook computer 440, and obtain a preset number of target video frames from the conference video. The preset number of frames may be determined by computing performance of the computer device currently performing object reconstruction. For example, the cloud execution server 430 can evaluate computing performance by querying memory utilization and GPU computing performance. In some embodiments, the cloud execution server 430 can divide its own computing performance into different levels, and match a corresponding preset number of frames for different levels of computing performance.

The cloud execution server 430 may input each target video frame into the video generation model, correspondingly predict the reconstructed video frame of each target video frame by using the video generation model, and synthesize a sequence of all the calculated reconstructed video frames to obtain a reconstructed video corresponding to the sender. The reconstructed video is then sent to a smart TV 420 of the receiver, and the reconstructed video can be displayed through video conference software 421.

Figure 8:
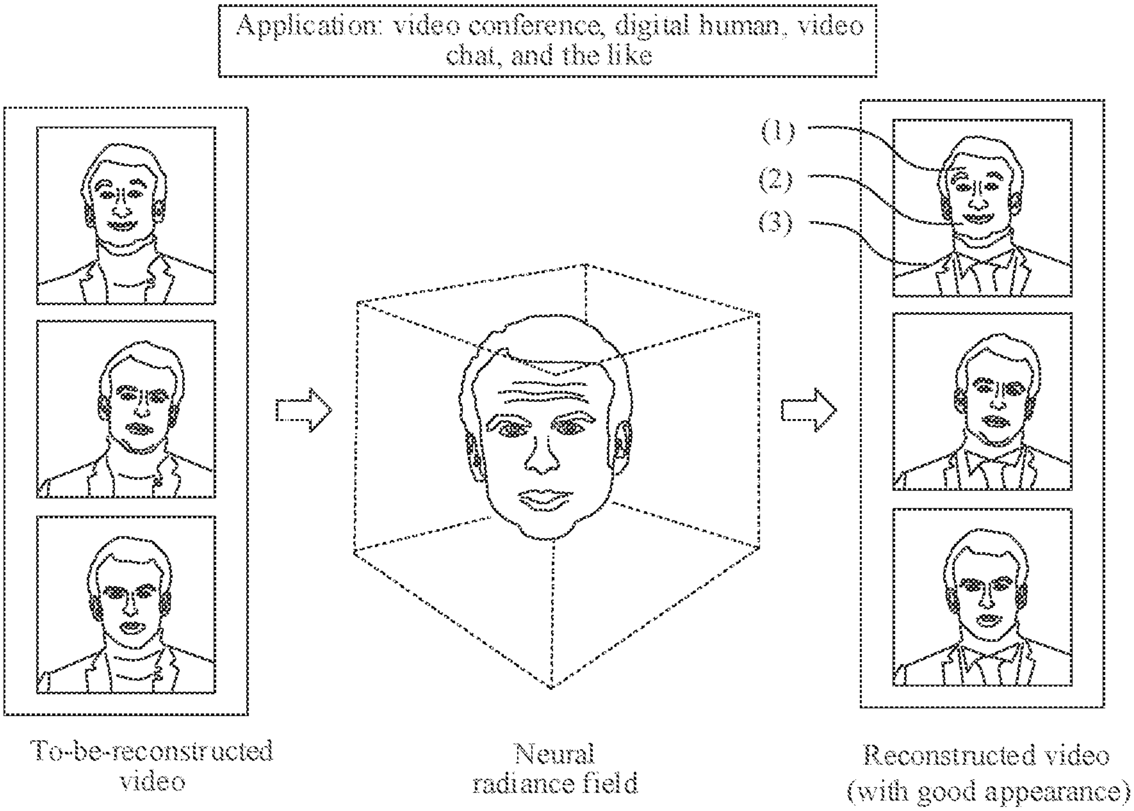
FIG. 8 is an implementation effect diagram of a method for training a video generation model according to an embodiment of this application.

FIG. 8 shows an implementation effect diagram of a method for training a video generation model. In this application, the implicit representation ability based on a single neural radiance field greatly improves the realism of the talking portrait video. The method for training a video generation model can be applied to application scenarios such as video conference, video chatting, livestreaming, and digital human that require reconstruction of talking portrait videos. The expression parameter and the phonetic feature are trained as the driving source of the single neural radiance field, a head pose and a facial expression in FIG. 8 (1) that accurately match the target video, and a mouth shape in FIG. 8 (2) that synchronizes with the audio of the target video can be obtained, all having different good appearances. In this application, the head pose information and the head position information are added in each video frame to the condition input of the single neural radiance field, guiding generation of the shoulder area, adapting to the head position, and finally generating natural, stable and coordinated shoulders in FIG. 8 (3). This avoids the problem of head-shoulder incoordination problem caused by rigid modeling of the head and shoulders.

In an embodiment of this application, an initial video of preset duration can be obtained, and is preprocessed based on a preset resolution and a preset sampling rate to obtain a training video. In this way, the initial video of the preset duration is obtained as training data, which can be used for network learning of video reconstruction. This avoids use of excessive training data and greatly improves efficiency of network training.

In this embodiment of this application, the condition input corresponding to the training video of the target user is extracted. The condition input includes the phonetic feature, the expression parameter, and the head parameter. The head parameter is used for representing the head pose information and the head position information. The network training is performed on the single neural radiance field based on the phonetic feature, the expression parameter, and the head parameter to obtain the video generation model. By introducing head pose information and head position information into the condition input, the video generation model can give a facial expression to the reconstructed portrait after considering the head motion, so that the reconstructed portrait has a high resolution. In addition, the shoulder motion state can be implicitly estimated based on the head pose information and the head position information, so that the generated reconstructed portrait can not only maintain the coordination between the head motion and the shoulder motion, but enable completeness of the head and shoulders of the reconstructed portrait.

In addition, the video generation model can be obtained through training based on the image reconstruction loss and the mouth emphasis loss. The image reconstruction loss is determined by the single neural radiance field based on the color value of the predicted object generated by the condition input and the color value of the real object. The mouth emphasis loss is determined by the single neural radiance field based on the color value of the predicted mouth generated by the condition input and the color value of the real mouth. In this way, when object reconstruction is performed on the target video of the target user based on the video generation model, the mouth motion of the obtained reconstructed video and that of the target video are synchronized, improving display realism of the reconstructed video.

Figure 9:
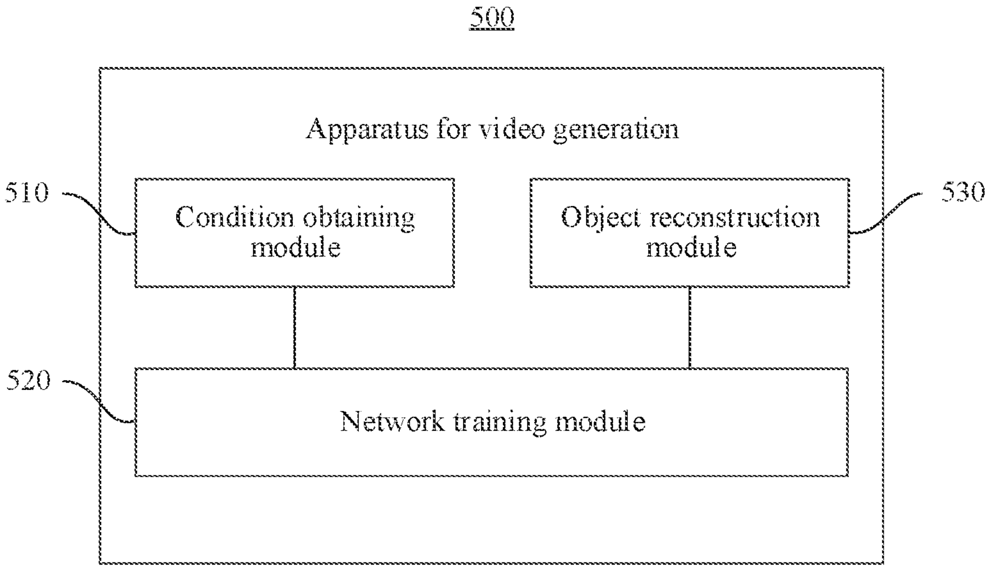
FIG. 9 is a module block diagram of an apparatus for training a video generation model according to an embodiment of this application.
Figure 10:
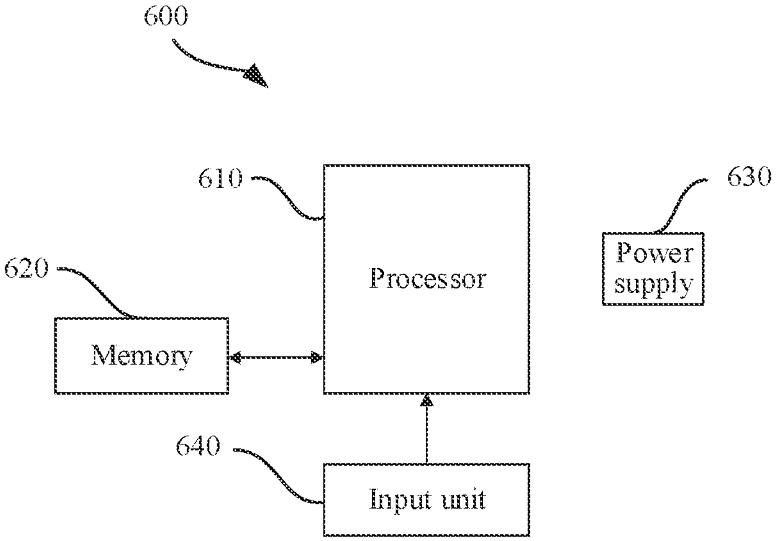
FIG. 10 is a module block diagram of a computer device according to an embodiment of this application.

FIG. 9 is a structural block diagram of an apparatus 500 for training a video generation model according to an embodiment of this application. The apparatus 500 for training a video generation model includes: a condition obtaining module 510, configured to obtain a training video of a target user; extract a phonetic feature, an expression parameter, and a head parameter of the target user from the training video, the head parameter being used for representing head pose information and head position information of the target user; and synthesize the phonetic feature of the target user, the expression parameter of the target user, and the head parameter of the target user to obtain a condition input of the training video; and a network training module 520, configured to perform network training on a preset single neural radiance field based on the condition input, three-dimensional coordinates, and a viewing direction to obtain a video generation model; the video generation model being obtained based on overall loss training, the overall loss including an image reconstruction loss, the image reconstruction loss being determined based on a color value of a predicted object and a color value of a real object, the color value of the predicted object being generated by the single neural radiance field based on the condition input, the three-dimensional coordinates, and the viewing direction, and the video generation model being configured to perform object reconstruction on a target video of the target user to obtain a corresponding reconstructed video of the target user.

In some embodiments, the condition obtaining module 510 can be specifically configured to: perform phonetic feature extraction on the training video of the target user to obtain the phonetic feature of the target user; perform three-dimensional face reconstruction on the training video of the target user to obtain a face shape representation of a three-dimensional face shape of the target user, and determine the expression parameter of the target user based on the face shape representation; perform transformation and mapping on the three-dimensional face shape of the target user to obtain a rotation matrix and a translation vector corresponding to the three-dimensional face shape; and determine the head pose information based on the rotation matrix, determine the head position information based on the translation vector, and obtain the head parameter of the target user based on the head pose information and head position information.

In some embodiments, the overall loss includes a mouth emphasis loss, the mouth emphasis loss being determined by a color value of a predicted mouth and a color value of a real mouth, and the color value of the predicted mouth being generated by the single neural radiance field based on the condition input, the three-dimensional coordinates, and the viewing direction.

In some embodiments, the apparatus 500 for training a video generation model further includes a sample obtaining unit.

The sample obtaining unit is configured to obtain three-dimensional coordinates and a viewing direction of a space sampling point on a camera ray, the camera ray being a ray emitted from a camera in capturing an image of a scene, and the camera ray corresponding to a pixel in a video frame.

The network training module 520 may include: a smooth processing unit, configured to perform temporal smoothing processing on the phonetic feature and the expression parameter to obtain a smooth phonetic feature and a smooth expression parameter; a sample calculation unit, configured to input the three-dimensional coordinates, the viewing direction, the smooth phonetic feature, the smooth expression parameter, and the head parameter to the single neural radiance field, and calculate a predicted color value and a volume density corresponding to the space sampling point; a loss determining unit, configured to determine an image reconstruction loss corresponding to an entire image area of the video frame of the training video for the video frame of the training video frame and based on the predicted color value and the volume density, and determine a mouth emphasis loss corresponding to a mouth image area of the video frame based on the predicted color value and the volume density; and a network training unit, configured to construct the overall loss with reference to the image reconstruction loss and the mouth emphasis loss, and perform the network training on the single neural radiance field based on the overall loss.

In some embodiments, the loss determining unit may include: a prediction subunit, configured to perform color integration on camera rays in the entire image area based on the predicted color value and the volume density and predict a color value of a predicted object corresponding to each camera ray in the entire image area; and a reconstruction loss subunit, configured to determine the image reconstruction loss corresponding to the entire image area based on the color value of the predicted object corresponding to each camera ray in the entire image area and the color value of the corresponding real object.

In some embodiments, the prediction subunit may be specifically configured to: obtain a cumulative transparency degree corresponding to each space sampling point on the camera ray in the entire image area, the cumulative transparency degree being generated by performing integration based on a volume density of the camera ray in a first integration interval; determine an integrand based on a product of the cumulative transparency degree, the predicted color value, and volume density; and perform color integration on the integrand in a second integration interval, and predict a color value of a predicted object corresponding to each camera ray in the entire image area, the first integration interval being a sampling distance of the camera ray from a near boundary to the space sampling point, and the second integration interval being a sampling distance of the camera ray from the near boundary to the far boundary.

In some embodiments, the loss determining unit is further configured to: perform image semantic segmentation on the video frame to obtain the mouth image area corresponding to the video frame; perform color integration on camera rays in the mouth image area of the video frame based on the predicted color value and the volume density, and predict a color value of a predicted mouth corresponding to each camera ray in the mouth image area; and determine the mouth emphasis loss corresponding to the mouth image area based on the color value of the predicted mouth and a color value of a corresponding real mouth corresponding to each camera ray in the mouth image area.

In some embodiments, the network training unit may be specifically configured to: obtain a weight coefficient; determine the overall loss based on the image reconstruction loss, the weight coefficient, and the mouth emphasis loss; perform iterative training on the single neural radiance field based on the overall loss until the single neural radiance field meets a preset condition.

In some embodiments, the apparatus 500 for training a video generation model may further include: an initial obtaining module, configured to obtain an initial video of preset duration, the initial video recording audio content of a speech of the target user; a preprocessing module, configured to perform preprocessing on the initial video based on a preset resolution and a preset sampling rate to obtain the training video, the preprocessing being used for anchoring object content of the target user in a center area of the video frame of the training video.

In some embodiments, the apparatus 500 training for a video generation model may further include an object reconstruction module 530.

The object reconstruction module 530 is configured to obtain a target video of the target user, and perform object reconstruction on the target video of the target user based on the video generation model to obtain a corresponding reconstructed video of the target user.

In some embodiments, the target video includes a conference video, and the object reconstruction module 530 may be specifically configured to:

obtain a preset number of target video frames from the target video; input each target video frame to the video generation model, and calculate a reconstructed video frame corresponding to each target video frame; and synthesize all the target video frames to obtain the reconstructed video corresponding to the target user.

A person skilled in the art may clearly understand that, for the objective of convenient and brief description, for a detailed working process of apparatus, and module described above, refer to a corresponding process in the method embodiments. Details are not described herein again.

In several embodiments provided in this application, the coupling between modules may be electrical or mechanical, or other forms of coupling.

In addition, functional modules in the embodiments of this application may be integrated into one processing module, or each module may exist alone physically, or two or more modules may be integrated into one module. The integrated module may be implemented in the form of hardware, or may be implemented in a form of a software functional module. In this application, the term “module” in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

In the solution of this application, the phonetic feature, the expression parameter, and the head parameter are extracted from the training video of the target user. The head parameter is used for representing the head pose information and the head position information of the target user. The phonetic feature, the expression parameter, and the head parameter are synthesized to obtain the condition input of the training video. The network training is performed on the preset single neural radiance field based on the condition input, the three-dimensional coordinates, and the viewing direction to obtain the video generation model. In this way, by introducing the head pose information and the head position information into the condition input, the video generation model can give a facial expression to the reconstructed portrait after considering the head motion, so that the reconstructed portrait has a high resolution. In addition, the shoulder motion state can be implicitly estimated based on the head pose information and the head position information, so that the generated reconstructed portrait can not only maintain the coordination between the head motion and the shoulder motion, but enable completeness of the head and shoulders of the reconstructed portrait.

In addition, the video generation model can be obtained through training based on the image reconstruction loss and the mouth emphasis loss. The image reconstruction loss is determined by the single neural radiance field based on the color value of the predicted object generated based on the condition input and the color value of the real object. The mouth emphasis loss is determined by the single neural radiance field based on the color value of the predicted mouth generated by the condition input and the color value of the real mouth. In this way, after object reconstruction is performed on a target video of the target user based on the video generation model, the obtained reconstructed video is synchronized with the mouth motion in the target video, improving display realism of the reconstructed video.

As shown in FIG. 10, an embodiment of this application provides a computer device 600. The computer device 600 includes a processor 610, a memory 620, a battery 630, and an input unit 640. The memory 620 stores a computer program. The computer program, when invoked by the processor 610 can perform the methods and steps in the foregoing embodiments. A person skilled in the art may understand that, the structure of the computer device shown in the figure does not constitute a limitation to the computer device. The computer device may include components that are more or fewer than those shown in the figure, or some components may be synthesized, or a different component deployment may be used.

Specifically, the processor 610 may include one or more processing cores. The processor 610 connects various parts in the entire battery management system by using various interfaces and lines, invokes data stored in the memory 620 by running or executing instructions, programs, instruction sets or program sets stored in the memory 620; performs various functions and data processing of the battery management system, and performs various functions and data processing of the computer device, achieving overall control of the computer device. In some embodiments, the processor 610 may be implemented in at least one hardware form of a digital signal processor (Digital Signal Processor, DSP), a field-programmable gate array (Field-Programmable Gate Array, FPGA), a programmable logic array (Programmable Logic Array, PLA). The processor 610 may integrate one or a combination of a central processing unit (Central Processing Unit, CPU) 610, a graphics processor unit (Graphics Processing Unit, GPU) 610, a modem, and the like. The CPU mainly processes an operating system, a user interface, an application program, and the like. The GPU is configured to manage rendering and drawing of displayed content. The modem mainly processes wireless communication. The foregoing modem may not be integrated into the processor 610, but may be implemented independently through a communication chip.

Although not shown in the figure, the computer device 600 may further include a display unit, and the like. Details are not described herein again. Specifically, in this embodiment, the processor 610 in the computer device may load executable files corresponding to progress of one or more computer programs into the storage 620, and the processor 610 runs, for example, a phone book or audio and video data stored in the storage 620, to implement various methods and steps provided in the foregoing embodiments.

Figure 11:
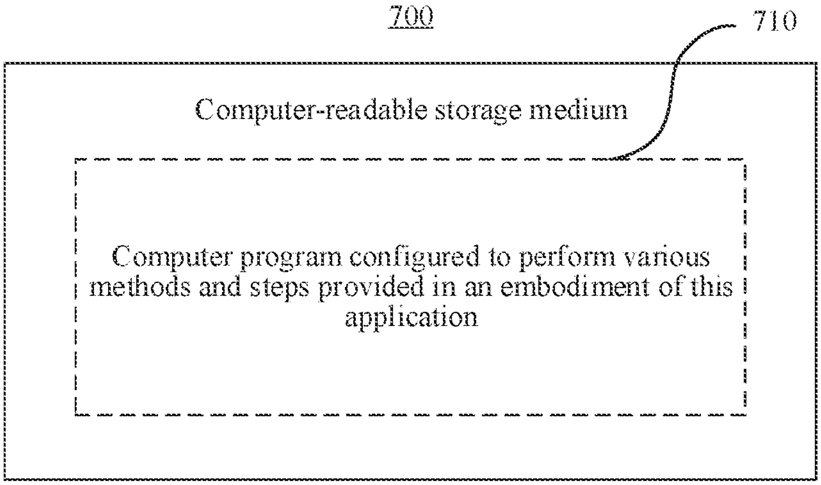
FIG. 11 is a module block diagram of a computer-readable storage medium according to an embodiment of this application.

As shown in FIG. 11, an embodiment of this application further provides a non-transitory computer-readable storage medium 700. The computer-readable storage medium 700 stores a computer program 710, and the computer program 710 can be invoked by the processor to perform various methods and steps according to the embodiments of this application.

The computer-readable storage medium may be an electronic memory such as a flash memory, an EEPROM (electrically erasable programmable read-only memory), an EPROM, a hard disk, or a ROM. In some embodiments, the computer-readable storage medium includes non-transitory computer-readable storage medium (Non-Transitory Computer-Readable Storage Medium). The computer-readable storage medium 700 has storage space for a computer program to perform any method or step in the above embodiments. These computer programs can be read from or written into one or more computer program products. Computer programs can be compressed in appropriate forms.

According to an aspect of this application, a computer program product is provided. The computer program product includes a computer program, and the computer program is stored in a computer-readable storage medium. A processor of a computer device reads the computer program from the computer-readable storage medium, and the processor performs the computer program, to enable the computer device to perform the methods and steps in the above embodiments.

The above are only exemplary embodiments of this application and are not intended to limit this application in any form. Although this application has been disclosed as above with exemplary embodiments, they are not intended to limit this application. Any person skilled in the art may use the technical content disclosed above to make slight changes or modifications to equivalent embodiments with equivalent changes without departing from the scope of the technical solution of this application. Any brief modifications, equivalent changes and modifications made to the above embodiments still fall within the scope of the technical solution of this application.

What is claimed is:

1. A method for training a video generation mode performed by a computer device, and the method comprising:

obtaining a training video of a target user;

extracting, from the training video, a phonetic feature of the target user, an expression parameter of the target user, and a head parameter of the target user, the head parameter of the target user representing head pose information and head position information of the target user;

synthesizing the phonetic feature of the target user, the expression parameter of the target user, and the head parameter of the target user to obtain a condition input of the training video; and performing network training on a neural radiance field based on the condition input, three-dimensional coordinates, and a viewing direction to obtain a video generation model, the neural radiance field being a single multi-layer perceptron including a first set of layers and a second set of layers arranged after the first set of layers, comprising:

inputting the condition input and the three-dimensional coordinates to the first set of layers, wherein the first set of layers output predicted volume density information and an intermediate feature; and inputting the intermediate feature and the viewing direction to the second set of layers, wherein the second set of layers output predicted color information, wherein the video generation model is configured to perform object reconstruction on a target video of the target user to obtain a corresponding reconstructed video of the target user.

2. The method according to claim 1, wherein the video generation model is obtained by optimizing an image reconstruction loss between a color value of a predicted object and a color value of a real object, the color value of the predicted object being generated by the neural radiance field based on the condition input, the three-dimensional coordinates, and the viewing direction.

3. The method according to claim 1, wherein the video generation model is obtained by optimizing a mouth emphasis loss between a color value of a predicted mouth and a color value of a real mouth, and the color value of the predicted mouth being generated by the neural radiance field based on the condition input, the three-dimensional coordinates, and the viewing direction.

4. The method according to claim 1, wherein the expression parameter of the target user is extracted by:

performing three-dimensional face reconstruction on the training video of the target user to obtain a face shape representation of a three-dimensional face shape of the target user; and determining the expression parameter of the target user based on the face shape representation.

5. The method according to claim 1, wherein the head parameter of the target user is extracted by:

performing three-dimensional face reconstruction on the training video of the target user to obtain a face shape representation of a three-dimensional face shape of the target user;

performing transformation and mapping on the three-dimensional face shape of the target user to obtain a rotation matrix and a translation vector corresponding to the three-dimensional face shape; and determining the head pose information based on the rotation matrix, determining the head position information based on the translation vector, and obtaining the head parameter of the target user based on the head pose information and the head position information.

6. The method according to claim 1, wherein the obtaining a training video of a target user comprises:

obtaining an initial video of preset duration, the initial video recording audio content of a speech of the target user;

performing preprocessing on the initial video to obtain the training video by anchoring a portrait of the target user of the initial video in a central area of a video frame of the training video.

7. The method according to claim 1, wherein the reconstructed video of the target user is obtained by:

obtaining a preset number of target video frames from the target video;

inputting each target video frame to the video generation model, and calculating a reconstructed video frame corresponding to the target video frame; and synthesizing the reconstructed video frames to obtain the reconstructed video corresponding to the target user.

8. A computer device, comprising:

a memory;

one or more processors coupled to the memory; and one or more computer programs that, when executed by the one or more processors, cause the computer device to perform a method for training a video generation mode including:

obtaining a training video of a target user;

extracting, from the training video, a phonetic feature of the target user, an expression parameter of the target user, and a head parameter of the target user, the head parameter of the target user representing head pose information and head position information of the target user;

synthesizing the phonetic feature of the target user, the expression parameter of the target user, and the head parameter of the target user to obtain a condition input of the training video; and performing network training on a neural radiance field based on the condition input, three-dimensional coordinates, and a viewing direction to obtain a video generation model, the neural radiance field being a single multi-layer perceptron including a first set of layers and a second set of layers arranged after the first set of layers, comprising:

inputting the condition input and the three-dimensional coordinates to the first set of layers, wherein the first set of layers output predicted volume density information and an intermediate feature; and inputting the intermediate feature and the viewing direction to the second set of layers, wherein the second set of layers output predicted color information, wherein the video generation model is configured to perform object reconstruction on a target video of the target user to obtain a corresponding reconstructed video of the target user.

9. The computer device according to claim 8, wherein the video generation model is obtained by optimizing an image reconstruction loss between a color value of a predicted object and a color value of a real object, the color value of the predicted object being generated by the neural radiance field based on the condition input, the three-dimensional coordinates, and the viewing direction.

10. The computer device according to claim 8, wherein the video generation model is obtained by optimizing a mouth emphasis loss between a color value of a predicted mouth and a color value of a real mouth, and the color value of the predicted mouth being generated by the neural radiance field based on the condition input, the three-dimensional coordinates, and the viewing direction.

11. The computer device according to claim 8, wherein the expression parameter of the target user is extracted by:

performing three-dimensional face reconstruction on the training video of the target user to obtain a face shape representation of a three-dimensional face shape of the target user; and determining the expression parameter of the target user based on the face shape representation.

12. The computer device according to claim 8, wherein the head parameter of the target user is extracted by:

performing three-dimensional face reconstruction on the training video of the target user to obtain a face shape representation of a three-dimensional face shape of the target user;

performing transformation and mapping on the three-dimensional face shape of the target user to obtain a rotation matrix and a translation vector corresponding to the three-dimensional face shape; and determining the head pose information based on the rotation matrix, determining the head position information based on the translation vector, and obtaining the head parameter of the target user based on the head pose information and the head position information.

13. The computer device according to claim 8, wherein the obtaining a training video of a target user comprises:

obtaining an initial video of preset duration, the initial video recording audio content of a speech of the target user;

performing preprocessing on the initial video to obtain the training video by anchoring a portrait of the target user of the initial video in a central area of a video frame of the training video.

14. The computer device according to claim 8, wherein the reconstructed video of the target user is obtained by:

obtaining a preset number of target video frames from the target video;

inputting each target video frame to the video generation model, and calculating a reconstructed video frame corresponding to the target video frame; and synthesizing the reconstructed video frames to obtain the reconstructed video corresponding to the target user.

15. A non-transitory computer-readable storage medium, storing a computer program, and the computer program, when executed by a processor of a computer device, causing the computer device to perform a method for training a video generation mode including:

obtaining a training video of a target user;

extracting, from the training video, a phonetic feature of the target user, an expression parameter of the target user, and a head parameter of the target user, the head parameter of the target user representing head pose information and head position information of the target user;

synthesizing the phonetic feature of the target user, the expression parameter of the target user, and the head parameter of the target user to obtain a condition input of the training video; and performing network training on a neural radiance field based on the condition input, three-dimensional coordinates, and a viewing direction to obtain a video generation model, the neural radiance field being a single multi-layer perceptron including a first set of layers and a second set of layers arranged after the first set of layers, comprising:

inputting the condition input and the three-dimensional coordinates to the first set of layers, wherein the first set of layers output predicted volume density information and an intermediate feature; and inputting the intermediate feature and the viewing direction to the second set of layers, wherein the second set of layers output predicted color information, wherein the video generation model is configured to perform object reconstruction on a target video of the target user to obtain a corresponding reconstructed video of the target user.

16. The non-transitory computer-readable storage medium according to claim 15, wherein the video generation model is obtained by optimizing an image reconstruction loss between a color value of a predicted object and a color value of a real object, the color value of the predicted object being generated by the neural radiance field based on the condition input, the three-dimensional coordinates, and the viewing direction.

17. The non-transitory computer-readable storage medium according to claim 15, wherein the video generation model is obtained by optimizing a mouth emphasis loss between a color value of a predicted mouth and a color value of a real mouth, and the color value of the predicted mouth being generated by the neural radiance field based on the condition input, the three-dimensional coordinates, and the viewing direction.

18. The non-transitory computer-readable storage medium according to claim 15, wherein the expression parameter of the target user is extracted by:

performing three-dimensional face reconstruction on the training video of the target user to obtain a face shape representation of a three-dimensional face shape of the target user; and determining the expression parameter of the target user based on the face shape representation.

19. The non-transitory computer-readable storage medium according to claim 15, wherein the head parameter of the target user is extracted by:

performing three-dimensional face reconstruction on the training video of the target user to obtain a face shape representation of a three-dimensional face shape of the target user;

performing transformation and mapping on the three-dimensional face shape of the target user to obtain a rotation matrix and a translation vector corresponding to the three-dimensional face shape; and determining the head pose information based on the rotation matrix, determining the head position information based on the translation vector, and obtaining the head parameter of the target user based on the head pose information and the head position information.

20. The non-transitory computer-readable storage medium according to claim 15, wherein the obtaining a training video of a target user comprises:

obtaining an initial video of preset duration, the initial video recording audio content of a speech of the target user;

performing preprocessing on the initial video to obtain the training video by anchoring a portrait of the target user of the initial video in a central area of a video frame of the training video.

* * * * *